(12) United States Patent
Nowac

(10) Patent No.: US 12,330,545 B2
(45) Date of Patent: Jun. 17, 2025

(54) VEHICULAR-BASED TRANSFORMING LED VOLUME

(71) Applicant: Magicbox World Inc, Moraga, CA (US)

(72) Inventor: Brian T. Nowac, Moraga, CA (US)

(73) Assignee: Magicbox World Inc, Moraga, CA (US)

( * ) Notice: Subject to any disclaimer, the term of this patent is extended or adjusted under 35 U.S.C. 154(b) by 0 days.

(21) Appl. No.: 18/771,556

(22) Filed: Jul. 12, 2024

(65) Prior Publication Data

US 2024/0359615 A1 Oct. 31, 2024

Related U.S. Application Data

(63) Continuation of application No. 17/661,419, filed on Apr. 29, 2022, now Pat. No. 12,059,992.

(60) Provisional application No. 63/294,743, filed on Dec. 29, 2021.

(51) Int. Cl.
| | |
|---|---|
| *B60P 3/00* | (2006.01) |
| *B60P 3/025* | (2006.01) |
| *G06F 3/01* | (2006.01) |
| *G09F 9/33* | (2006.01) |
| *G09F 13/22* | (2006.01) |
| *H02J 7/35* | (2006.01) |

(52) U.S. Cl.
CPC ............ *B60P 3/0252* (2013.01); *B60P 3/0255* (2013.01); *G06F 3/011* (2013.01); *G09F 9/33* (2013.01); *G09F 13/22* (2013.01); *G09F 2013/222* (2013.01); *H02J 7/35* (2013.01)

(58) Field of Classification Search
CPC ...... B60P 3/0252; B60P 3/0255; G06F 3/011; G09F 9/33; G09F 13/22; G09F 2013/222; H02J 7/35
See application file for complete search history.

(56) References Cited

U.S. PATENT DOCUMENTS

| | | | |
|---|---|---|---|
| 9,266,460 B2* | 2/2016 | Jung | E04H 3/28 |
| 11,132,838 B2* | 9/2021 | Cordes | H04N 13/156 |
| 2006/0202850 A1* | 9/2006 | Hefright | G09F 13/22 |
| | | | 340/815.45 |
| 2012/0272585 A1* | 11/2012 | Bilsen | E04H 3/28 |
| | | | 180/167 |
| 2012/0277010 A1* | 11/2012 | Bilsen | B60P 3/0252 |
| | | | 472/75 |
| 2013/0106191 A1* | 5/2013 | Iovino | H02J 5/00 |
| | | | 307/72 |
| 2015/0350628 A1* | 12/2015 | Sanders | G06F 3/011 |
| | | | 345/419 |

* cited by examiner

*Primary Examiner* — Mark R Wendell

(57) ABSTRACT

Systems and method for a vehicular-based transforming LED (VBTLED) volume. As an example, the system includes a transforming trailer, mountable to a vehicle. The trailer has one or more fixed interior surfaces and a one or more movable interior surfaces, a floor, and a ceiling. The trailer also includes a first LED panel coupled to a first movable surface such that movement of first movable surface moves the first LED panel; a second LED panel coupled to a first fixed surface; and a third LED panel coupled to at least one of a second movable surface or a second fixed surface. The first LED panel, the second LED panel, and the third LED panel form an LED volume configured to display visuals for a background of a scene filmed within the LED volume.

20 Claims, 14 Drawing Sheets

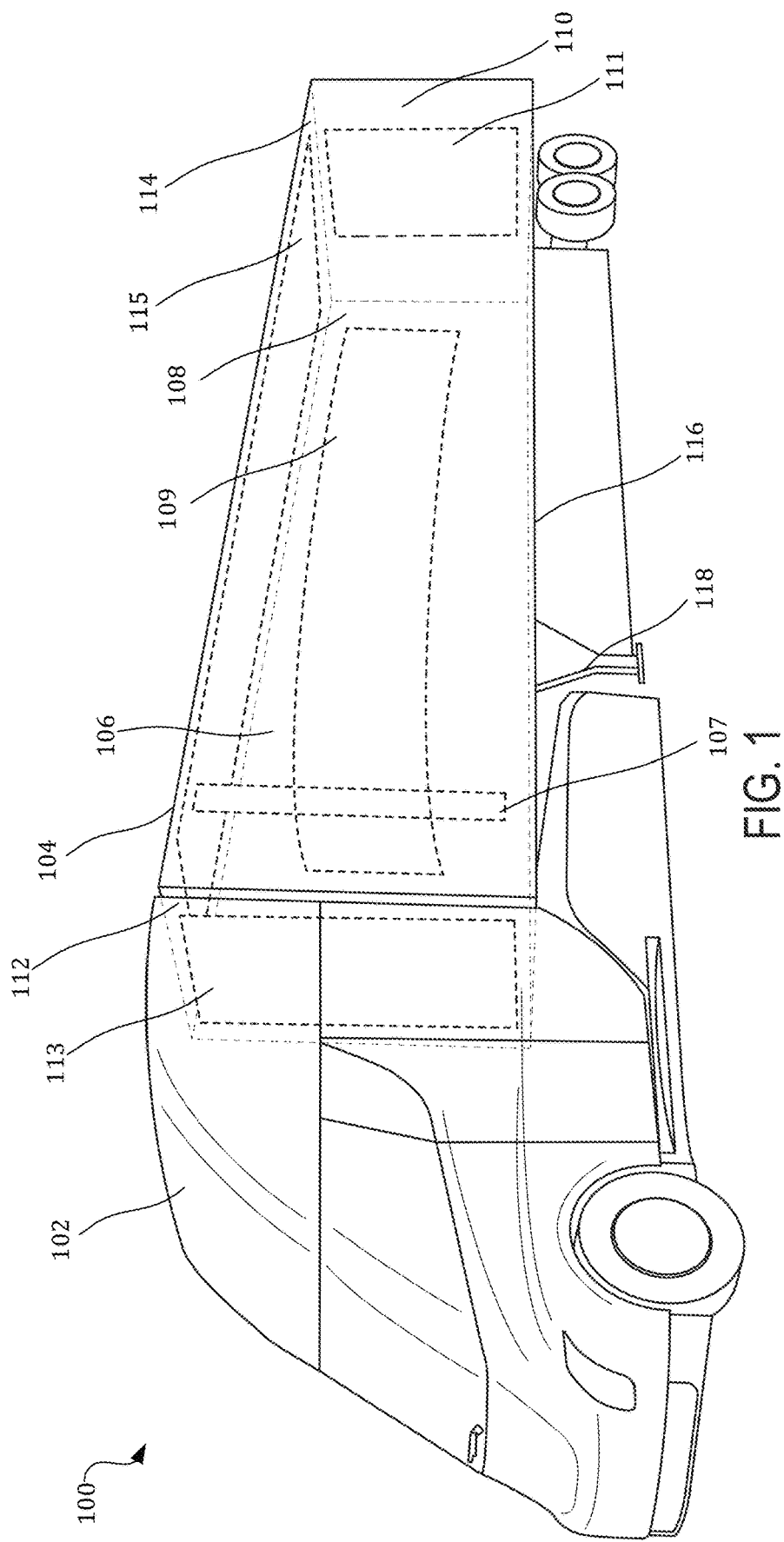

VEHICULAR-BASED TRANSFORMING LED VOLUME

CROSS-REFERENCE TO RELATED APPLICATION

This application is a continuation of U.S. patent application Ser. No. 17/661,419 filed Apr. 29, 2022, which claims the benefit of U.S. Provisional Application No. 63/294,743, filed on Dec. 29, 2021, and which applications are incorporated herein by reference in their entireties.

INTRODUCTION

When filming a movie or other video, a scene is generally arranged with actors or objects in the foreground and other elements provided in the background. When the filming is performed "on location," the background may be the actual background of location where the filming occurs. Sometimes, however, filming on location is not possible due to the location being fictional or otherwise not accessible. In such situations, a "green screen" has traditionally been used where a green background is provided behind the actors or foreground objects. The green background is then changed after filming to add visual effects or an artificial background. More recently, the green screen concept has been replaced with light-emitting diode (LED) volumes. The LED volumes provide live video that forms the background behind the foreground actors and objects. Thus, unlike a green screen, the background does not need to be artificially changed after filming occurs. Rather, the video displayed in the LED volume is captured in the filming process.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

In an aspect, the technology relates to a portable light-emitting diode (LED) volume system that includes a transforming trailer, mountable to a vehicle, the trailer having one or more fixed interior surfaces and a one or more movable interior surfaces, a floor, and a ceiling; a first LED panel coupled to a first movable surface of the one or more movable surfaces such that movement of first movable surface moves the first LED panel; a second LED panel coupled to a first fixed surface of the one or more fixed surfaces; and a third LED panel coupled to at least one of a second movable surface of the one or more movable surfaces or a second fixed surface of the one or more fixed surfaces. The first LED panel, the second LED panel, and the third LED panel form an LED volume configured to display visuals for a background of a scene filmed within the LED volume.

In an example, the system further includes a camera tracking system, including at least one position identifier mountable to a camera and a tracking system mounted to one of the movable surfaces or one of the fixed surfaces, the tracking system configured to track the position of the position identifier on the camera. In another example, the visuals change based on the tracked position of the position identifier on the camera. In still another example, the visuals extend across the first LED panel, the second LED panel, and the third LED panel to form a contiguous visual representation of the background. In yet another example, the system further includes a battery-based power system capable of powering the LED volume. In still yet another example, the system further includes a battery-based power system capable of storing regenerated power captured through the use of at least one of solar panels mounted on an exterior of the trailer, an external power source, or a shore power source. In a further example, the system further includes a heating, ventilation, and air-conditioning (HVAC) system in place to keep the LED Volume and adjacent areas of the trailer temperature controlled.

In another example, at least one of the first LED panel, the second LED panel, or the third LED panel are positionable to form different configurations of the LED volume. In yet another example, the different configurations of the LED volume correspond to 3D LED Volume template for a video rendering engine. In still another example, the ceiling includes a fourth LED panel.

In another aspect, the technology relates to a method for operating a vehicular-based transforming LED (VBTLED) volume. The method includes expanding one or more walls of a portable enclosure of the VBTLED volume to form an expanded portable enclosure; positioning a plurality of LED panels within the expanded portable enclosure to form a physical configuration of an LED volume; loading a 3D LED Volume template, corresponding to the physical configuration, into a 3D rendering engine; and displaying visuals, generated by the rendering engine, on the plurality of LED panels within the expanded portable enclosure.

In an example, the method further includes identifying, via position sensors, the positions of the plurality of LED panels. In another example, the method further includes generating the 3D LED Volume template based on the identified positions of the plurality of LED panels. In yet another example, the method further includes tracking the position of a camera relative to the LED volume; and adjusting the visuals displayed on the plurality of LED panels based on the tracked position of the camera. In a further example, the method further includes capturing a scene within the LED volume, wherein the visuals on the LED panels provide a background for the captured scene. In still another example, the method further includes collapsing the one or more expanded walls and delivering the VBTLED volume to a new location.

In another aspect, the technology relates to a method for accessing a vehicular-based transforming LED (VBTLED) volume. The method includes receiving a query for a VBTLED volume, wherein the query includes a destination location; based on the destination location, identifying one or more VBTLED volumes; display a VBTLED volume of the identified VBTLED volumes in a user interface; receiving a booking confirmation for the VBTLED volume for a specified duration; and delivering the VBTLED volume to the destination location prior to the specified duration.

In an example, the method further includes tracking the location of a plurality of VBTLED volumes, wherein identifying the one or more VBTLED volumes is based on the tracked location of the VBTLED volumes. In another example, the user interface includes a status information section and a detailed information section. In still another example, the method includes uploading footage captured in the VBTLED volume to a cloud-based storage.

In another aspect, the technology relates to a transformable light-emitting diode (LED) volume system that includes a primary LED panel; a first stage-left LED panel coupled to the primary LED panel; a second stage-left LED panel rotatably coupled to the first stage-left LED panel such that the second stage-left LED panel can be rotated inwards towards the primary LED panel; a first stage-right LED panel coupled to the primary LED panel; and a second stage-right LED panel rotatably coupled to the first stage-right panel, such that the second stage-right LED panel can be rotated inwards towards the primary LED panel.

In an example, the system further includes a third stage-left LED panel rotatably coupled to the second stage-left LED panel such that the third stage-left LED panel can be rotated outwards away from the primary LED panel. In another example, the system further includes a third stage-right LED panel rotatably coupled to the second stage-right LED panel such that the third stage-right LED panel can be rotated outwards away from the primary LED panel. In yet another example, the system further includes a first ceiling LED panel. In a further example, the system further includes a second ceiling LED panel rotatably coupled to the first ceiling LED panel such that the second ceiling LED panel can rotate downwards towards to the primary LED panel.

In another example, the system further includes a rail positioned in a gap between the first ceiling LED panel and the second ceiling LED panel, the rail including attachment positions for lighting. In still another example, the primary LED panel has a pixel pitch that is less than the pixel pitch of the first stage-left LED panel and the first stage-right LED panel. In yet another example, the pixel pitch of the primary LED panel is less than 2.0 mm. In still yet another example, the pixel pitch of the primary LED panel at least 1.5 times less than the pixel pitch of the first stage-left LED panel and the first stage-right LED panel.

In another aspect, the technology relates to a method of collapsing a transformable light-emitting diode (LED) comprising a primary LED panel, a first stage-left LED panel, a second stage-left LED panel, a first stage-right LED panel, and a second stage-right LED panel, a first ceiling LED panel, and a second ceiling LED panel. The method includes rotating the second stage-left LED panel, towards the primary LED panel, about a hinge coupling the second stage-left LED panel and the first stage-left LED panel; rotating the second stage-right LED panel, towards the primary LED panel, about a hinge coupling the second stage-right LED panel and the first stage-right LED panel; and rotating the second ceiling LED panel downwards, towards the primary LED panel, about a hinge coupling the second ceiling LED panel and the first ceiling LED panel. In an example, the LED volume further includes a third stage-left LED panel and a third stage-right LED panel, and the method further includes rotating the third stage-left LED panel, away from the primary LED panel, about a hinge coupling the third stage-left LED panel and the second stage-left LED panel; and rotating the third stage-right LED panel, away from the primary LED panel, about a hinge coupling the third stage-right LED panel and the second stage-right LED panel.

In another aspect, the technology relates to a vehicular-based transforming LED volume that includes a portable enclosure, configured to be transported by a vehicle, the portable enclosure including a first lateral wall, an expandable second lateral wall, a floor, and a ceiling. The portable enclosure further includes a primary LED panel connected to the first lateral wall; a first stage-left LED panel coupled to the primary LED panel; a second stage-left LED panel rotatably coupled to the first stage-left LED panel such that the second stage-left LED panel can be rotated inwards towards the primary LED panel, wherein the second stage-left LED panel extends into an expanded portion of the portable enclosure when the expandable second lateral wall is in an expanded state; a first stage-right LED panel coupled to the primary LED panel; and a second stage-right LED panel rotatably coupled to the first stage-right LED panel, such that the second stage-right LED panel can be rotated inwards towards the primary LED panel, wherein the second stage-right LED panel extends into the expanded portion of the portable enclosure when the expandable second lateral wall is in the expanded state.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 1 depicts a perspective view of an example of a vehicular-based transforming LED volume.

DETAILED DESCRIPTION

Figure 2A:
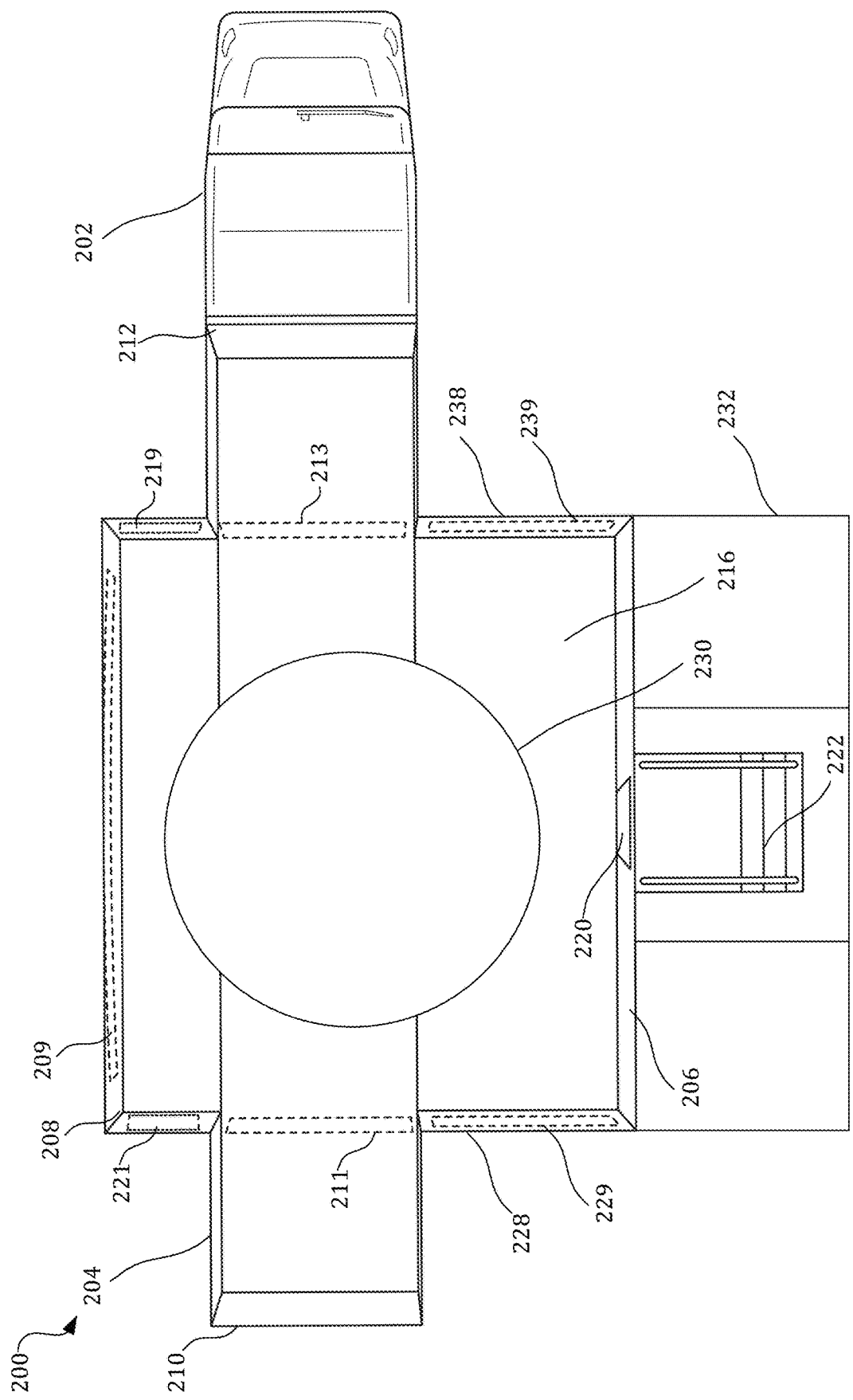
FIG. 2A depicts a top view of an example of a vehicular-based transforming LED volume in its expanded state.

The following detailed description refers to the accompanying drawings. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

As discussed above, LED volumes have provided unique advantages over green screen techniques in that the LED volumes provide live backgrounds that can be captured directly by cameras during filming and can be seen by the actors during filming. LED volumes, however, tend to be incredibly large permanent structures with significant permanent infrastructure to control and power the volumes. Such permanent installations severely limit access to those LED volumes, and those LED volumes are often prohibitively expensive to replicate in different locations.

To help address those issues and increase access and usability of LED volumes, the present technology introduces a vehicular-based transforming LED (VBTLED) volume that is mobile, portable, and/or transportable to different locations. The VBTLED volume may include a truck and a trailer that may be expandable. The trailer includes a plurality of LED panels that may be incorporated into expandable walls of the trailer. When the expandable walls of the trailer are transformed into their expanded state, the LED panels form a full LED volume where filming can occur. The trailer may be transformed within a short period of time to pre-calibrated positions of the LED panels that allow for the motion tracking systems of the VBTLED volume to be operational upon the trailer being transformed. Thus, within minutes or hours of arrival of the VBTLED volume, filming and production can begin in the LED volume.

FIG. 1 depicts a perspective view of an example of a vehicular-based transforming LED (VBTLED) volume 100. The example VBTLED volume 100 includes a tractor unit, vehicle, or truck 102 and a semi-trailer or trailer 104. In some examples, the trailer 104 may be referred to as a "sidecar." The truck 102 includes a cab that allows for a driver to drive the truck 102 and an engine to power the truck 102. The truck 102 has a trailer 104 attached to the rear of the truck 102. The trailer 104 may be detachable, mountable, and/or removable from the truck 102. Accordingly, the truck 102 may drive to a location and detach the trailer 104 from the truck 102. At a later point in time, the truck 102 (or another truck) may return to the location to pick up the trailer 104 and move it to another location. In some examples of the present technology, the truck 102 may include an autonomous driving system to allow for driverless delivery and a retrieval of the trailer 104.

The trailer 104 includes a driver-side wall 108, a passenger-side wall 106, a rear wall 110, and a front wall 112. While the terms such as front, back, right, and left are used herein for clarity, it should be appreciated that such directional terms are not intended to be limiting. For instance, the relative directional position of the walls may be different from different perspectives and viewpoints. As such, the walls may be similarly referred to as a first wall, second wall, third wall, fourth wall, etc. The passenger-side wall 106 and driver-side wall 108 may be referred to as lateral side walls or a first lateral side wall and a second lateral side wall. The trailer 104 also includes a ceiling 114 and a floor 116.

Additional leveling or support structures 118 may also be incorporated outside of the trailer 104 to provide support for the trailer 104—particularly when the trailer is disconnected from the truck 102. The support structures 118 may extend from a bottom portion of the trailer 104 to the ground to provide stability for the trailer 104. While the term trailer 104 is used primarily herein, the term portable enclosure may also be used and the LED volume of the portable enclosure may be considered a portable LED volume.

One or more of the walls, ceiling, and floors of the trailer 104 may be expandable as discussed further below. One or more of the walls, ceiling, and floors may also include LED panels that form an LED volume. For instance, in the example depicted, the passenger-side wall 106 includes a passenger-side LED panel 109, the rear wall 110 includes a rear LED panel 111, the front wall 112 includes a front LED panel 113, and the ceiling 114 includes a ceiling LED panel 115. The driver-side wall 108 may also include a driver-side LED panel 107 that may become a stage-side LED panel when the trailer 104 is expanded. In addition, the floor 116 may also include an LED panel in some examples. Thus, LED panels may be coupled or connected to the walls and/or interior surfaces of the trailer 104. While the term "walls" are primarily used herein, the term surfaces may also be used to describe inner surfaces of the trailer 104.

In addition to the LED panels, the VBTLED volume 100 may include additional components and features for operating the LED volume during filming and production. For example, the VBTLED volume 100 may include a power supply which may be battery based and may also be charged by the vehicle 102. Additionally or alternatively, one or more external power sources may be provided as well, and the vehicle 102 may be considered to be an example of such an external power source. The power supply may provide, or be capable of providing, at least 400 amps of continuous current to power the LED volume and related computing components. In some examples, the power supply may be incorporated as a wall of batteries onboard the trailer 104. Solar panels may also be incorporated on the roof of the trailer 104 or the truck 102 to further charge the batteries.

The VBTLED volume 100 may also include motion tracking equipment, which may include a motion tracking sensor and a motion-tracking position indicator that can be attached to a camera during filming to track the location of the camera. This may be a pre-configured system that may be designed specifically for each individual VBTLED volume. Such integration allows for easy, fast, and reliable integration of any camera existing today or in the future. For instance, the motion-tracking position indicator may be attached to any camera, which allows for the use of a wide variety of camera technology, from old film cameras to any advanced cameras available today or in the future.

Supercomputing hardware systems may also be provided onboard the trailer 104 or truck 102. The supercomputing hardware systems allow for real-time rendering of images and/or video on the LED panels of the LED volumes during production and filming. Such computing hardware systems are in communication with the motion tracking system such that the rendered images and videos may be based on the tracked position of the camera(s) used during production. The computing hardware systems may also include 3D rendering software, which may be similar to or include 3D graphical rendering software utilized for 3D gaming. Networking components may also be provided in the VBTLED volume 100 to allow for network or access to remote storage and computing resources, such as access to cloud resources.

Heating, ventilation, and air conditioning (HVAC) systems may also be incorporated into the VBTLED volume 100 to provide temperature-controlled regions of the trailer 104, such as in the LED volume. Due to the large amount of power consumed by the VBTLED volume 100, cooling systems may be beneficial to prevent overheating of the hardware components and also to provide comfort to the production crew during filming. The HVAC systems may be standalone systems provided on the trailer 104 and/or may be integrated with HVAC systems of the truck 102.

In addition, sound and/or light proofing or dampening material may be incorporated into the walls, floor, and/or ceiling the VBTLED volume 100 to reduce the external noise and light from entering the LED volume. Such sound and/or light proofing also may help reduce the noise and light that leaves the LED volume during filming within the VBTLED volume 100.

Figure 2B:
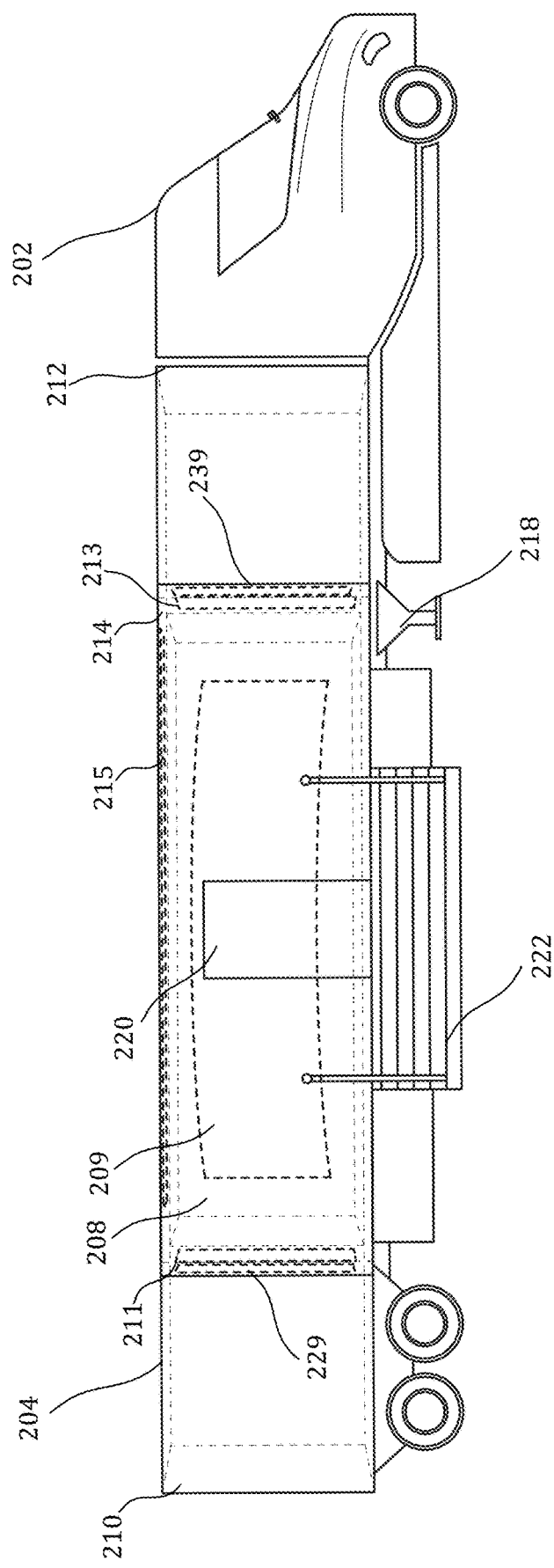
FIG. 2B depicts a side view of the example of a vehicular-based transforming LED volume depicted in FIG. 2A.

FIG. 2A depicts a top view of an example of a vehicular-based transforming LED volume 200 in its expanded or transformed state. FIG. 2B depicts a side view of the example of a vehicular-based transforming LED volume 200 depicted in FIG. 2A. FIGS. 2A-2B are discussed concurrently. As should be appreciated, the expansion configurations depicted in FIGS. 2A-2B are one example of how the trailer 204 may expand, and additional or different expansion configurations that increase the footprint of the trailer 204 are also contemplated. The trailer 204 may also be disconnected from the truck 202 prior to being expanded. In some examples, in the expanded state, the footprint of the expanded trailer 204 may be approximately 45 feet by 30 feet with a height of approximately 14 feet. In other words, the footprint of the expanded trailer 104 may be between approximately 700 square feet to 1350 square feet, although other sizes are also possible.

In the example depicted in FIGS. 2A-2B, both the passenger-side wall 206 and the driver-side wall 208 are expandable or movable and shown in their expanded state, and the front wall 212 and the rear wall 210 are fixed or static. Expanding the passenger-side wall 206 and/or the driver-side wall 208 may include sliding the walls outward from the center of the trailer 204. For instance, expandable rails may be included that allow the walls to expand outward. In such examples, portions of the floor 216 and the ceiling 214 may also expand as the walls are expanded. In other examples, portions of the wall may rotate outward around one or more hinges. For instance, the walls may include two segments, similar to doors, that rotate outward. For example, passenger-side wall 206 may have a first expandable or rotatable segment 228 and a second expandable or rotatable segment 238 that rotate or slide outwards from the trailer 204. In other examples, one or the other of the passenger-side wall 206 and/or the driver-side wall 208 may be expandable. For instance, the wall to which the largest LED panel is coupled may be static or non-expandable.

The ceiling 214 may also expand by raising upward. The raising of the ceiling 214 may be accomplished through an electronically controlled riser system, crank system, or other suitable system for raising a surface such as the ceiling 214.

In the example depicted, the driver-side wall 208 includes an elongated LED panel 209 along the expandable portion of the driver-side wall 208. The elongated LED panel 209 may also be curved. The elongated LED panel 209 may have a width that is substantially greater than the height of the LED panel 209. For instance, the width of the elongated LED panel 209 may be about two times greater, or more, than the width of the elongated LED panel 209.

The front wall 212 and the rear wall 210 may be fixed. For instance, the front wall 212 and the rear wall may not expand outward like the driver-side wall 208 and passenger-side wall 206. The front wall 212 may include an LED panel 213 that may be located near or aligned with the front wall 212, and another LED panel 211 may be located near or aligned with the rear wall 210. The first expansion segment 228 of the passenger-side wall 206 of the passenger-side wall 206 may include an LED panel 229 and the second expansion segment 238 may also include an LED panel 239. Expandable segments of the driver-side wall 208 may include LED panels 219, 221 as well. Depending the size of the expansion segments, the LED panels 219, 221, 229, 239 may have heights that are substantially similar to their widths.

In the production or expanded state of the LED volume, the front LED panel 213 and the rear LED panel 211 may also be positioned towards the center of the trailer 204 such that the rear LED panel 211 aligns with the first-segment LED panel 229 and the front LED panel 213 substantially aligns with the second-segment LED panel 239. Additional LED segments 219, 221 may also be incorporated into the expandable segments of the driver-side wall 208 to provide a more contiguous extension of LED panels, as discussed above. Additional configurations of the walls and LED panels are also possible, and such configurations may change depending the user and the desired configurations. While in the example depicted, only a portion of the passenger-side wall 206 and the driver-side wall 208 expand outward from the trailer 204, in other examples, substantially all of the passenger-side wall 206 and/or the driver-side wall 208 may expand to better align the LED panels 229, 239 with the front LED panel 213 and the rear LED panel 211 without having to separately move the LED panels 211, 213.

The additional space between the rear LED panel 211 and the rear wall 210 may be used for storage of the additional computing and power systems that are utilized in the VBTLED volume, as discussed above. The additional space between the front LED panel 213 and the front wall 212 may also be similarly utilized. The additional space may also be used by film crews during production and filming.

When in the expanded or production state, the trailer 204 forms an LED volume where the floor 216 operates as a stage for filming and production. A rotatable stage 230 may also be included in the floor 216 to allow for a portion of the state to rotate. The rotatable stage 230 may be a turntable-type floor. Rotation of the rotatable stage 230 may be performed manually or automatically controlled through the computing components of the system.

The LED volume may include LED panels on at least three sides of the stage and on the ceiling in some examples. For instance, one wall of the LED volume may be formed by the elongated LED panel 209. Another wall of the LED volume may be formed by the one or more of the LED panels 211, 221, 229. The third wall of the LED volume may be formed by one or more of the LED panels 213, 219, 239. The ceiling 214 may also have a ceiling LED panel 215. Thus, when an actor is on the stage, the actor may be filmed with a video or image background presented by the LED panels forming the LED volume.

Ramps and/or stairs 222 and a door 220 may be included on the expandable portion of the passenger-side wall 206 to access the interior of the trailer 204 when the trailer is in the expanded state. The opening that results from opening the door(s) 220, allows for moving props, sets, vehicles and people in and out of the trailer 204. In some examples, the opening may be expandable to allow for additional flexibility in moving such objects. The ramp or stairs 222 remove the need for lowering the trailer 204 to ground level to be operational. In other examples, the ramp or stairs 222 may be incorporated on another wall the trailer 204. The ramp or stairs 222 may be retractable. Support structure 218 may also be included.

A motion tracking system (not depicted) may also be incorporated in or near the LED volume. The motion tracking system may include one or more motion tracking sensors that are mounted to a surface of the LED volume or trailer 204. For instance, the motion tracking sensors may be attached or mounted to a portion of the ceiling. An additional sensor or indicator may then be mounted to a camera used during filming to allow the motion tracking system to track the position of the camera relative to the LED volume during filming.

The exterior walls of the vehicular-based transforming LED volume 200 (e.g., passenger-side wall 206, driver-side wall 208, rear wall 210, and front wall 212) may be referred to as the outer shell or exoskeleton of the trailer 204 or vehicular-based transforming LED volume 200. The outer shell may be made from a hard, solid material in the form of removable panels which allow for rear access to the LED panels, wiring, and sound dampening material. One purpose of the exoskeleton is to protect the interior of the trailer 204 from any atmospheric elements or other exterior forces which could physically damage the components, such as the LED panels, housed within the trailer 204. Another purpose of the exoskeleton is to aid in dampening or eliminating both external sound and light from entering the interior of the trailer 204. In some examples, a layer of insulation is attached to the exoskeleton panels to aid in sound reduction. In addition, the outer surfaces of the exoskeleton are opaque, and may include flexible gaskets, to seal seams between movable surface to block external light from passing through the seams.

As shown in FIG. 2A, an additional tent structure 232 may be included in the vehicular-based transforming LED volume 200. For instance, the additional tent structure 232 may extend outward from an exterior of the passenger-side wall 206 or the wall that includes the door 220. The additional tent structure 232 may include at least two extension rods extending outward and away from the exterior of the passenger-side wall 206. Two or more rods may then extend downwards, from the extension rods, to the ground to provide support of the extension rods. A tent material (e.g., fabric or flexible material) may then be supported by the rods to form the additional tent structure 232. With the additional tent structure 232 in place, the door 220 or opening is shrouded by the additional tent structure 232 which provides protection around the door and allows for additional operations outside of the interior of the vehicular-based transforming LED volume 200. The area under the additional tent structure 232 does not have the same degree of sound and light reduction as the interior of the vehicular-based transforming LED volume 200. However, the additional tent structure 232 still provides some degree of protection from light, atmospheric elements (e.g., wind, rain), and external sound. In some examples, the additional tent structure 232 may also include one or more motion tracking sensors for tracking the position(s) of the camera(s). Such motion tracking sensors may be incorporated into the ceiling of the additional tent structure 232. Accordingly, the usable area of camera tracking can be extended outside of the interior of the vehicular-based transforming LED volume 200.

Figure 2C:
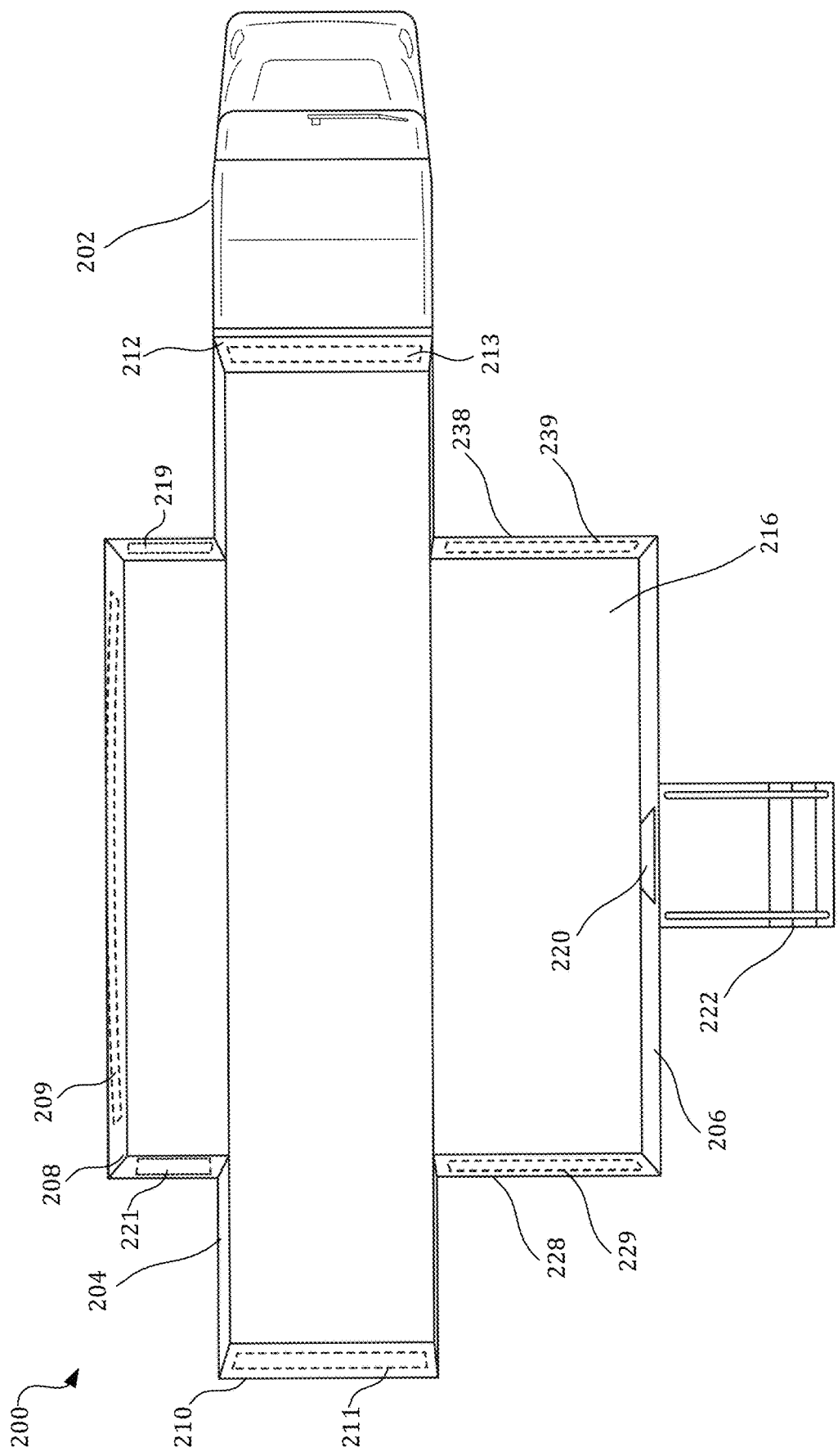
FIG. 2C depicts a top view of another example of a vehicular-based transforming LED volume.

When production is completed, prior to the trailer 204 being collapsed, one or more of the LED panels may be secured for transportation. One example of securing the LED panels is shown in FIG. 2C, where the LED panels 211 and 213 have been secured to walls or surfaces of the trailer 204. For instance, the LED panel 211 has been secured to the front wall 212 and the LED panel 213 has been secured to the rear wall 210.

Figure 2D:
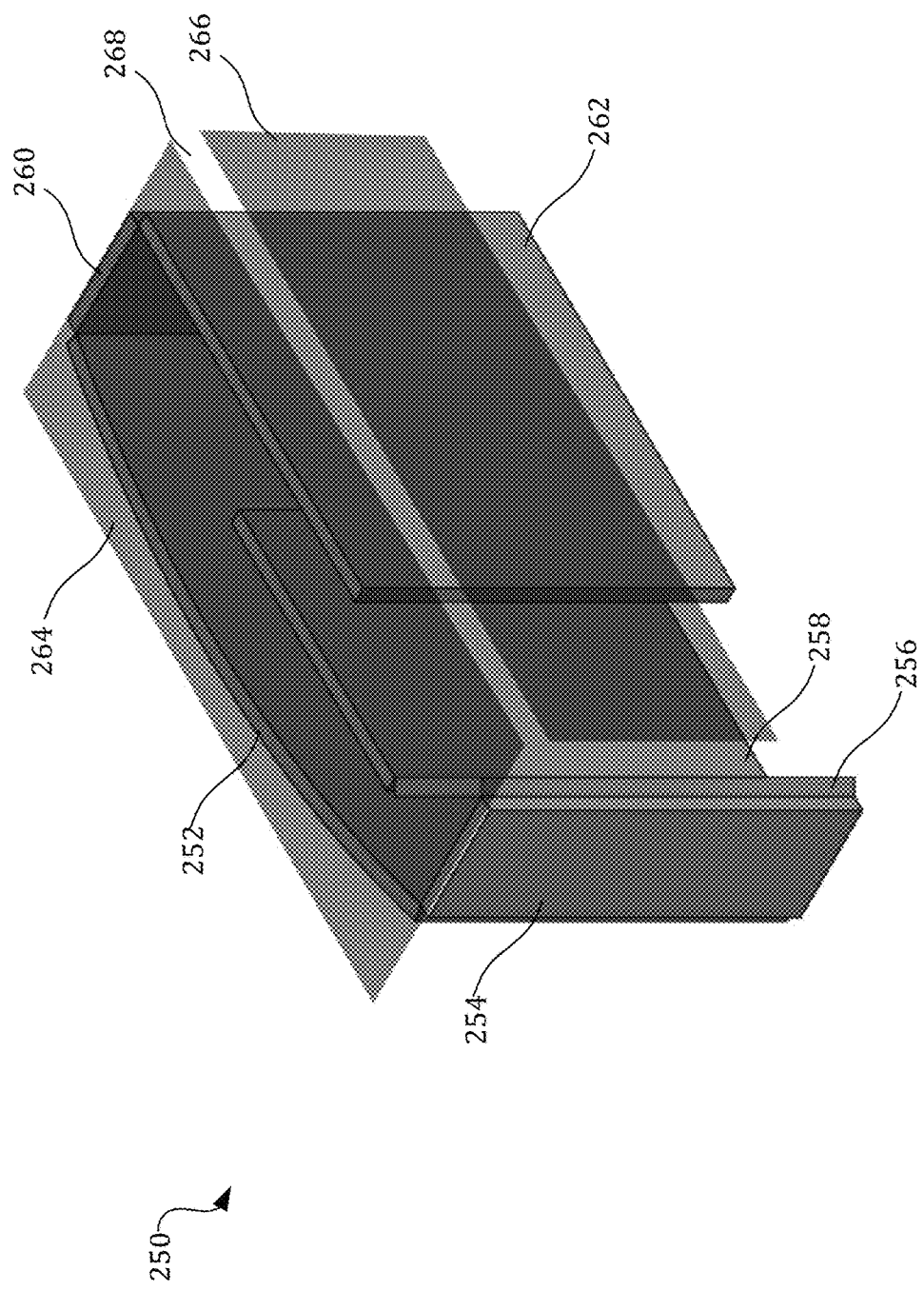
FIG. 2D depicts LED panels of an LED volume in a collapsed state.

The LED panels may also be collapsed or folded in towards one another for transport. One example of such a collapsed state of the LED panels of an LED volume 250 is shown in FIG. 2D. More specifically, in FIG. 2D, the LED volume 250 includes a primary LED panel 252, which is curved in the example depicted. Coupled to the primary LED panel 252 is an upstage-right LED panel 254, a midstage-right LED panel 256, and a downstage-right LED panel 258. Also coupled to the primary LED panel 252 is an upstage-left LED panel 260 and a downstage-left LED panel 262. In other examples, the stage-left LED panels may also include a third midstage-left LED panel (not depicted) between the upstage-left LED panel 260 and the downstage-left LED panel 262. In such examples, the LED volume 250 includes three stage-left LED panels and three stage-right LED panels. The LED panels shown in FIG. 2D may also correspond to the LED panels shown in FIGS. 2A-2C and discussed above.

Adjacent LED panels may be rotatably coupled to one another via coupling means that allow for rotation around the respective LED panels, such as a hinge. For instance, the upstage-right LED panel 254 may be coupled to the midstage-right LED panel 256 via a hinge, and the midstage-right LED panel 256 may be coupled to the downstage-right LED panel 258 via another hinge. Thus, the respective LED panels may be rotated about the hinges to collapse the LED volume 250. In the example depicted, the midstage-right LED panel 256 is rotated inwards towards the primary LED panel 252, which also causes the downstage-right LED panel 258 rotate inward towards the primary LED panel 252. The downstage-right LED panel 258 may be rotated outwards with respect to the midstage-right LED panel 256 to allow the downstage-right LED panel 258 to be more parallel or aligned with the primary LED panel 252 when in the collapsed state.

The stage-left LED panels may be similarly coupled via hinges. For instance, the downstage-left LED panel 262 may be coupled to the upstage-left LED panel 260 via a hinge. When in the collapsed state, the downstage-left LED panel 262 may be rotated inwards toward the primary LED panel 252. In the collapsed configuration shown, the downstage-right LED panel 258 is positioned between the primary LED panel 252 and the downstage-left LED panel 262.

The LED volume 250 may also include one or more ceiling LED panels. In the example depicted, the LED volume 250 includes two ceiling LED panels: an upstage-ceiling LED panel 264 and a downstage-ceiling LED panel 266. The upstage-ceiling LED panel 264 may be coupled to the downstage-ceiling LED panel 266 via a hinge as well such that the downstage-ceiling LED panel 266 may be rotated downwards and towards the primary LED panel 252. In the example depicted, in the collapsed state, the downstage-left LED panel 262 and the downstage-right LED panel 258 are positioned between the primary LED panel 252 and the downstage-ceiling LED panel 266.

A gap 268 between the upstage-ceiling LED panel 264 and the downstage-ceiling LED panel 266 may also be present to allow for additional film-production components, such as lighting, to be positioned in the ceiling. For instance, a speed rail may be positioned in the gap 268 and include a plurality of attachment positions for lights or other film-production components.

In the example depicted in FIG. 2D, the LED volume 250 includes eight LED panels. In examples where the stage-left panels include three LED panels, the LED 250 includes nine LED panels. In general, the LED volumes discussed herein may include at least four LED panels. Each of the LED panels discussed above may be mounted to interior surfaces of the trailer 204 that move or rotate in manners as discussed above relating to the respective LED panels.

Figure 2E:
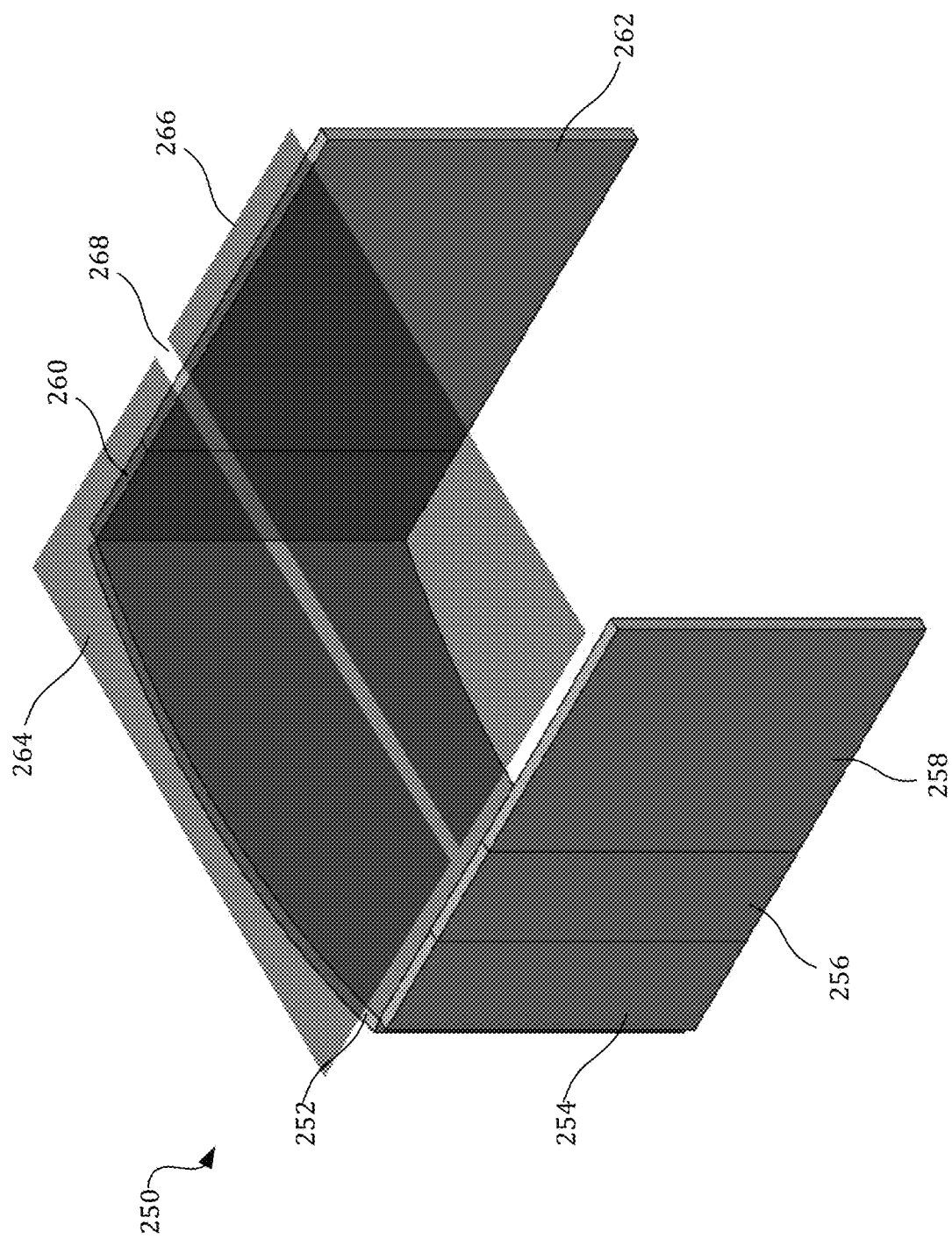
FIG. 2E depicts LED panels of an LED volume in a production state.

FIG. 2E depicts the LED panels of the LED volume 250 in an expanded or production state. To expand the LED volume, the LED panels are rotated about the hinges in the opposite direction than when they were collapsed. For instance, expanding the LED volume 250 may result in the upstage-right LED panel 254, midstage-right LED panel 256, and the downstage-right LED panel 258 all being aligned. Similarly, expanding the LED volume 250 may also result in the upstage-left LED panel 260 and the downstage-left LED panel 262. Expansion of the LED volume 250 may result in the upstage-ceiling LED panel 264 and a downstage-ceiling LED panel 266 being aligned and substantially orthogonal to the primary LED panel 252, the stage-left LED panels, and/or the stage-right LED panels. Collapsing and expanding the LED volume 250 may be done manually or automatically through a series of motors or robotics coupled to the hinges and/or the LED panels themselves.

In some examples, the different LED panels may have different resolutions or pixel pitches. The pixel pitch is the distance from one LED light to another LED light in the panel. A lower pixel pitch results in a higher resolution of the panel. A lower pixel pitch, however, also includes more LED lights and corresponding components, which increases weight and cost of the respective panels.

In an example, the primary LED panel 252 may have the highest resolution or lowest LED pitch. In some examples, the primary LED panel 252 may have an LED pitch of less than 2.0 mm or 1.5 mm, such as 1.3 mm. The stage-left and stage-right LED panels may have a lower resolution or higher pixel pitch than the primary LED panel 252. For example, the stage-left and stage-right LED panels may have a pixel pitch of greater than 2.0 mm, such as a pixel pitch of 2.6 mm. The ceiling LED panels may have a lower resolution or higher pixel pitch than the stage-left and stage-right LED panels. For example, the ceiling LED panels may have a pixel pitch of greater than 3.0 mm, such as 3.8 mm. Accordingly, the pixel pitch of the side LED panels (e.g., the stage-left and stage-right LED panels) may be at least 1.5-2.5 times greater than the pixel pitch of the primary LED panel 252, and the pixel pitch of the ceiling LED panels may be at least 1.5-2.5 times greater than the pixel pitch of the side LED panels.

The use of differing pixel pitches for the different LED panels allows for not only cost savings but also an increase in durability and functionality. For example, since the side LED panels move during the expanding and collapsing of the LED volume 250, the higher pixel pitch reduces the overall weight of those panels allowing for easier movement. In contrast, the primary LED panel 252 may not move during the expansion process and is thus better suited for having a higher weight density. In addition, because the primary LED panel 252 may be the primary background used for film production, the lower pixel density provides a higher resolution of the background and makes it more difficult to distinguish the individual LED lights of the LED panel. The ceiling LED panels may be made even lighter through the higher pixel pitch. Decreasing the weight of the ceiling LED panels allows for the ceiling panels to be secured to the ceiling more easily as gravity is constantly attempting pull the ceiling panels downward.

Figure 3B:
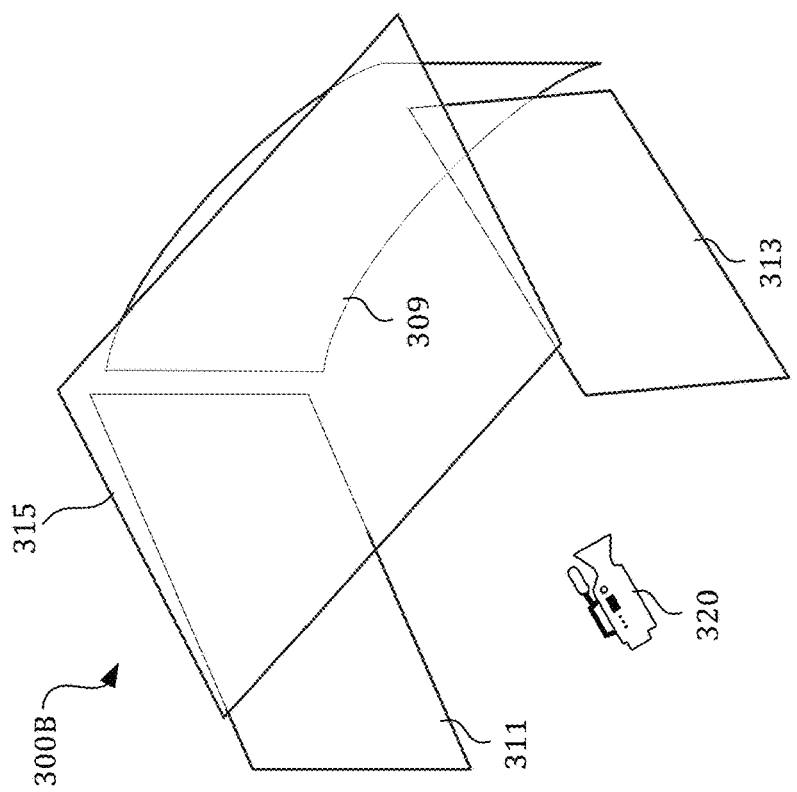
FIG. 3B depicts another example 3D LED volume template.
Figure 3A:
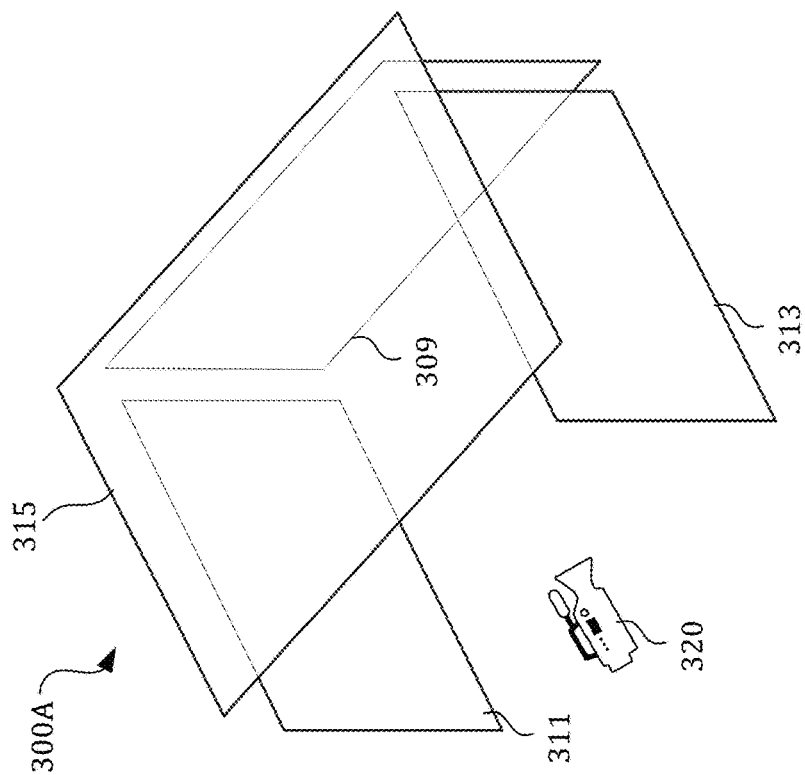
FIG. 3A depicts an example 3D LED volume template.

FIG. 3A depicts an example three dimensional (3D) LED Volume template 300A. The example 3D LED Volume template 300A is a virtual representation of the LED panels that matches a specific position and orientation of the LED panels in the trailer when in the expanded state, which may also be referred to as the production-ready state. The 3D template is used by the rendering engine that provides the visuals (e.g., images and/or videos) on the LED panels of the LED volume. The 3D LED Volume template may need to match the actual physical configuration of the LED panels to properly display the visuals in the correct position on the LED panels. For instance, as the camera within or around the LED volume, the background visuals displayed on the LED panels automatically update to reflect a perspective view as if background was a real physical environment.

In the 3D LED Volume template 300A, there are four LED panels that are all orthogonal to each adjacent LED panel. In other examples, however, there may be more LED panels in the 3D LED Volume template. For instance, for an LED volume depicted in FIGS. 2D-2E, eight LED panels may be represented in the corresponding 3D LED Volume template.

In the example depicted in FIG. 3A, the four panels include a stage-right panel 311, a stage-left panel 313, a rear panel 309, and a ceiling panel 315. For instance, three walls and ceiling are provided by the LED panels and each angle is 90 degrees. This 3D LED Volume template may correspond to a specific physical configuration of the LED panels in the trailer. Accordingly, when a crew expands the trailer and sets the positions of the LED panels to that specific position, the crew may then provide a selection of the 3D LED Volume template 300A to the 3D rendering engine. By having prepared the 3D LED Volume template to animate into various configurations, the LED volume is essentially pre-configured for different layouts and effectively ready for immediate use in any orientation once the trailer and/or LED volume is transformed into its production state. The 3D LED Volume template 300A may also include a camera indicator 320 that indicates the position of a camera. Such a camera position may be tracked as well and the template 300A may be updated as the position of the camera changes, as discussed further herein. In some examples, multiple camera indicators 320 may be included in the template 300A where multiple cameras are used in production.

FIG. 3B depicts another example LED volume 3D template 300B. The template 300B corresponds to a different physical configuration of the LED panels. For instance, as compared to 3D template 300A, the rear panel 309 is a curved panel and the stage-right panel 311 and the stage-left panel 313 are angled in slightly different manner. Accordingly, where the physical arrangement of the LED panels matches that of the 3D template 300B, the 3D template 300B is selected for the rendering engine.

The physical position of the LED panels may also be automatically detected via one or more position sensors in the trailer. The position sensors may sense the position of the LED panels via light detection, radar detection, physical switches, and/or other types of position sensors. When the positions of the LED panels are detected, the 3D LED Volume template may automatically be adjusted to match the orientation of the real-world LED Volume. This is done to preserve the integrity and accuracy of the pre-configured system.

In some examples, only a single 3D template may be used, and the physical LED panels are configured to be in the same position each time the trailer is expanded such that the 3D template remains accurate to the physical world. This may be accomplished by having specific stops or markings on the movable portions of the LED panels and/or walls of the trailer.

Figure 4A:
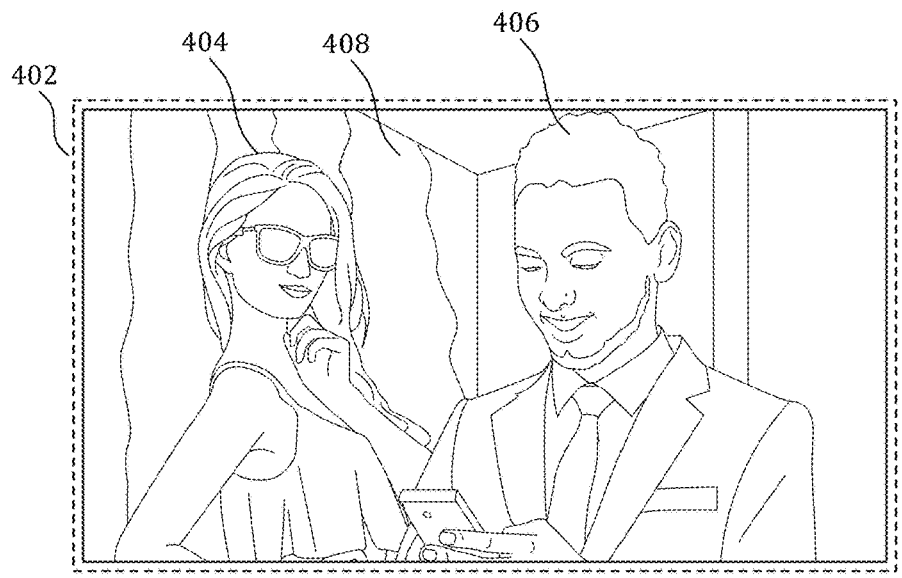
FIGS. 4A-4C depicts example scenes filmed with a vehicular-based transforming LED volume.
Figure 4B:
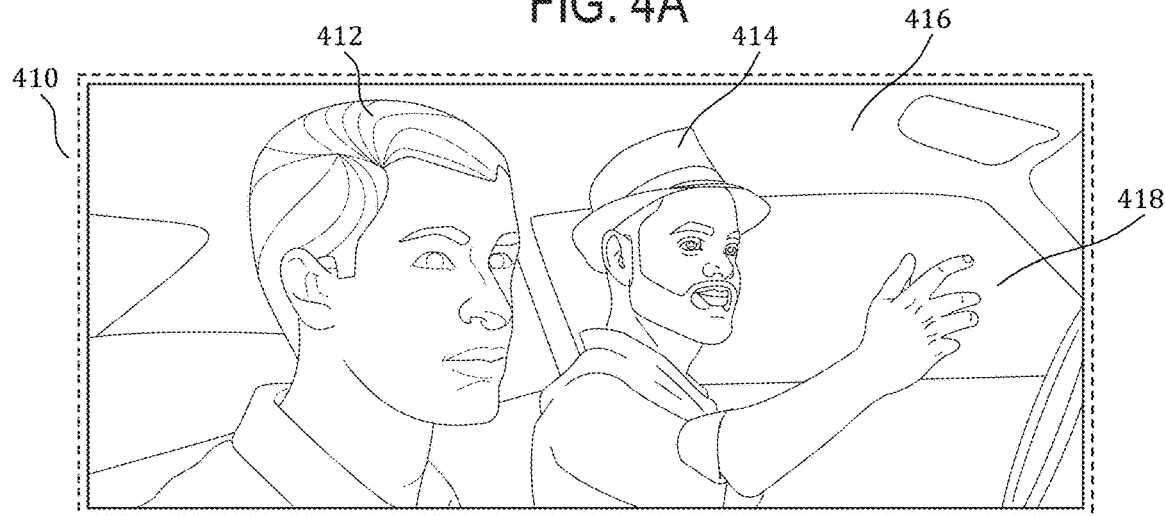
Figure 4C:
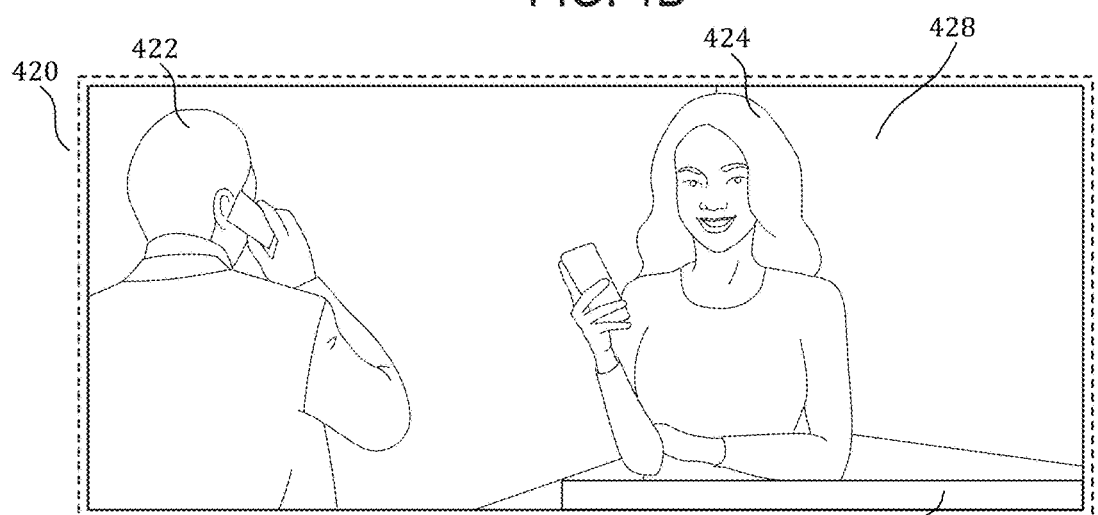

FIGS. 4A-4C depicts example scenes filmed with a vehicular-based transforming LED volume. While the VBTLED volume provides a reduced footprint and stage size from full-scale production environments, there are still a significant number of frequently filmed scenes that can readily be filmed within the smaller VBTLED volume. For instance, one common scene is a two-person scene 402 (FIG. 4A) where a first actor 404 and a second actor 406 are interacting. Such scene types may occur frequently, but the backgrounds 408 for the scenes may need to change frequently. Accordingly, with the VBTLED volume, the actors 404, 406 may be located on the stage of the LED volume, and the background 408 may be provided by presenting visuals on the LED panels of the LED volume. As the camera pans around the actors 404, 406, the background 408 may automatically update to reflect the correct perspective, which would not be possible with a static background image (e.g., a large canvas) and would be quite difficult to achieve with a green screen, which would also include significant post-production efforts.

Another frequently filmed scene is a moving car scene 410 (FIG. 4B) with actors 412, 414 in a vehicle 416 that is intended to appear as if it is moving. Such scenes may also be filmed in the VBTLED volume where the moving background 418 (often viewed through the window of the vehicle 416) may appear moving via video output of the LED panels. In such examples, the stage of the LED volume is large enough to house a vehicle, such as a standard-size passenger car.

Yet another frequently filmed scene is an over-the-shoulder scene 420 (FIG. 4C) that is filmed over one actor's 422 shoulder while another actor 424 converses with the first actor 422. Such scenes may also include additional physical props or foreground objects 426. Such foreground objects 426 and actors 422, 424 may be located on the stage during filming while the background 428 is provided virtually via visuals displayed on the LED panels of the LED volume.

Figure 5:
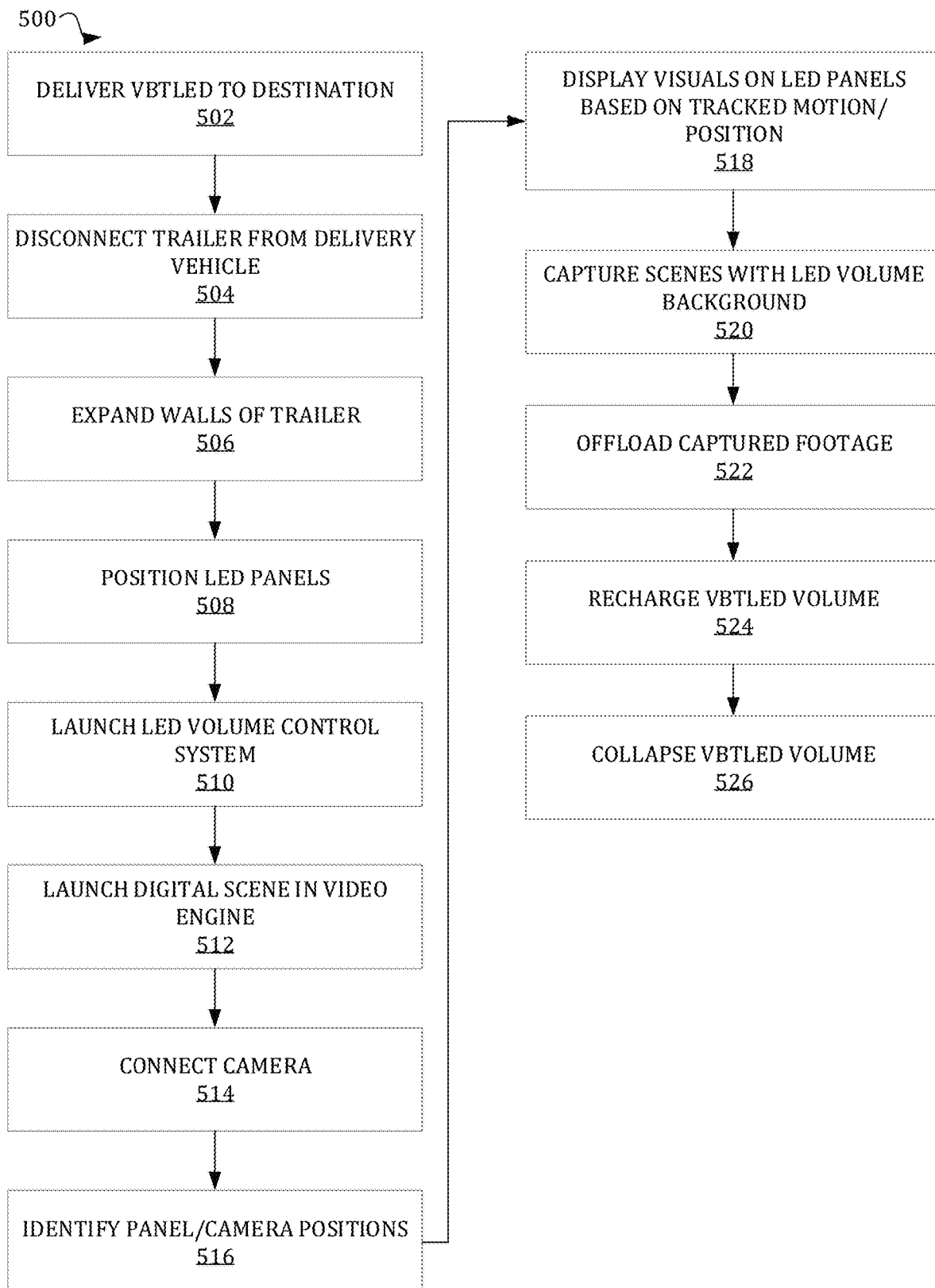
FIG. 5 depicts an example method for transforming the vehicular-based transforming LED volume.

FIG. 5 depicts an example method 500 for transforming the vehicular-based transforming LED volume. At operation 502, the VBTLED volume is delivered to a requested destination. For instance, the truck may be driven to a particular destination where the trailer is dropped off for a period of time or the truck and the trailer may remain together at the destination. In some examples where the truck may provide an additional power source to the trailer or other resources to the trailer and the LED volume, the truck may stay at the destination with the trailer. In some aspects, the VBTLED volume may be delivered autonomously through an autonomous driving system.

At operation 504, the trailer may be disconnected from the delivery vehicle. For instance, the support structures for the trailer may be put in position, and the trailer is unhooked or offloaded from the truck such that the truck may travel to another destination without the trailer. Operation 504 may also include leveling the trailer. Leveling of the trailer may be performed automatically by a self-leveling or auto-leveling system of the trailer that raises or lowers respective ends of the trailer. The self-leveling or auto-leveling operations may be initiated based on a selection from a user of a button, switch, or other input element.

At operation 506, once the VBTLED volume has arrived at its destination, the trailer is expanded into its expanded or production state. Expanding the trailer may include sliding or rotating walls, ceilings, and/or floors outward. For instance, the longest or lateral walls of the trailer, or portions thereof, may be slid outwards to expand the interior volume of the trailer. In other examples, segments of the walls may rotate about one or more hinges to expand outward from the trailer. The expansion of the walls of the trailer may be completed manually or be automated through a series of motors connected to expansion actuators (sliders, rotators, etc.) that automatically move the walls to their expanded positions.

In an example, expansion of the trailer may include expanding the front of the stage by expanding a corresponding lateral wall of the trailer, such as the passenger-side wall in the examples depicted above. Expanding the wall of the trailer also expands the corresponding floor section of the trailer that forms the stage. The ceiling section may also be expanded with expansion of the wall. An automatic expansion may be initiated based on a selection from a user of a button, switch, or other input element. The floor or stage may also be lowered or flipped open into an operable position. The stairs or ramp may also be extended or attached to the trailer. For instance, where the ramp is extendable and retractable, the ramp is extended outward from its retracted position. In other examples, the ramp or stairs may be retrieved from a storage compartment of the trailer and attached to the door or opening of the expanded wall. The back of the stage may also be expanded by expanding the wall corresponding to the back of the stage (e.g., the driver-side wall 208 in the examples discussed above). An automatic expansion may be initiated based on a selection from a user of a button, switch, or other input element.

At operation 508, the LED panels are positioned within the trailer when the trailer is in its expanded state. Some of the LED panels may be automatically positioned where the LED panels are mounted to the moveable walls and move with the walls. Some of the LED panels may also be automatically positioned where the LED panels are connected to fixed walls of the trailer. In other examples, however, the LED panels may be positioned or repositioned after the walls of the trailer are expanded. The LED panels may be positioned to particular positions corresponding to pre-defined configurations with prepared 3D templates. Once the walls are expanded and the LED panels are positioned, the VBTLED volume may be considered to be in its production state. As an example, an LED volume in its collapsed state shown in FIG. 2D may be expanded to its production state shown in FIG. 2E.

Positioning the LED panels may include unfolding the LED panels from their transportation state to the production state. For instance, during transportation, the LED panels may be locked into their transportation state or position. During operation 508, the LED panels may be unlocked from their transportation positions, swung or otherwise moved into their production positions, and then locked into place to allow for a production state or mode. The side walls and ceiling panels may be unfolded in a particular order such that collisions between panels or other damage is prevented as well as to help provide proper positioning in the production state.

At operation 510, the LED volume control system is launched. Launching the LED volume control system may include activating at least one of the external network connection, local wireless (e.g., WiFi) network, system servers, image processor, motion tracking system, and/or video game engine brain bar. A complete system diagnostics and LED quality assurance procedure may also be conducted. Launching the LED volume control system may also include attaching external power supply cables where utilized. A sequence of switches or input elements may also be activated to allow for power to flow from battery cells or an external power supply to the powered systems of the VBTLED volume. Once power has been supplied to the VBTLED volume, switches or other input elements may be activated to boot compute systems of the VBTLED volume. Substeps of operations 508 and 510 may be performed manually, automatically through the computing system of VBTLED volume, and/or remote activated.

At operation 512, the project featuring the digital scene, also called a map or level, is launched inside the video engine software, which may be a 3D rendering engine such as video game engine software. A 3D LED Volume template corresponding to the real-world LED volume along with a proprietary set of plugins is then merged into this scene and configured with a customized sequence of settings. As discussed above, the video engine is the primary source for the digital scene delivered to the LED panels.

At operation 514, any physical camera may be connected to the camera motion tracking system. Connecting the camera to the motion tracking system may include connecting motion tracking position indicator to the camera. Such a motion tracking position indicator may be wireless and require no integration with the electronics of the camera. Rather, the position indicator is tracked by the position/motion tracking system to indicate the position of the camera. Accordingly, as discussed above, any physical camera, ranging from a mobile phone to film cameras to modern digital cameras, and even any cameras developed in the future, may be used and connected to the camera motion tracking system.

At operation 516, the position of the real-world camera and the LED panels (and/or adjustable walls) are identified or calibrated. The identification may be performed automatically through the use of one or more position sensors. The location of the LED panels and the camera may be used to generate or identify the 3D LED Volume template for the video rendering engine. In other examples, the positions of the camera or LED panels may be manually calibrated or adjusted by a crew member within the 3D rendering engine.

At operation 518, visuals (e.g., digital environments, still images or videos) are displayed on the LED panels of the LED volume. This includes digital environments deployed via the 3D rendering engine via the 3D LED Volume template indicated above or through some other image visualizer or video playback software. At operation 520, various scenes are captured by the camera(s) which may include the visuals on the LED panels as well as any real-world objects or people inside the LED volume. As the camera capturing the scene is moved, the position of the camera may be tracked, and the visuals displayed on the LED panels of the LED volume may be updated or altered based on the position of the camera relative to the LED volume.

Operation 518 may also include controlling a rotatable portion of the stage. For instance, a rotation mechanism (e.g., motor) may be activated to cause the rotatable portion of the stage to rotate. The rate and direction of the rotation may be controlled to synchronize the rotation of the stage with the visuals that are presented on the LED panels and/or based on the moving position of the camera(s). To maintain synchronization, additional sensors may be incorporated to track the position of the rotatable stage. The signals from those sensors may be used as feedback to control rotation of the rotatable portion of the stage.

At operation 522, any captured footage may be manually transferred to local portable storage devices and/or automatically uploaded to the operator's choice of cloud-based storage providers. The upload to a remote storage device may be accomplished through network communications provided by the VBTLED volume and activated in operation 510.

At operation 524, the trailer may be connected to an external power source such as the towing vehicle, an external generator, or shore power to be recharged (e.g., allow the battery system of the trailer to be recharged). For example, when the trailer is operated under battery power from batteries onboard the trailer, the use of the trailer and the LED volume drains the power from the batteries. Once production or use of the VBTLED is completed, the batteries may be recharged before delivery to another location.

At operation 526, the VBTLED volume is collapsed from its expanded position. Collapsing the VBTLED volume may include effectively the reverse of the steps taken during operations 506-510 where the VBTLED volume was expanded. For instance, the LED panels are stored or positioned in their travel positions, which may be a secured position that prevents damage to the LED panels during transport. For instance, the LED volume may be collapsed from the production state shown in FIG. 2E to the collapsed state shown in FIG. 2D. The walls may then be collapsed back into the trailer. Once the VBTLED volume is collapsed, the VBTLED volume may be connected to the truck or delivery vehicle and delivered to another destination where the method 500 may be repeated.

Figure 6:
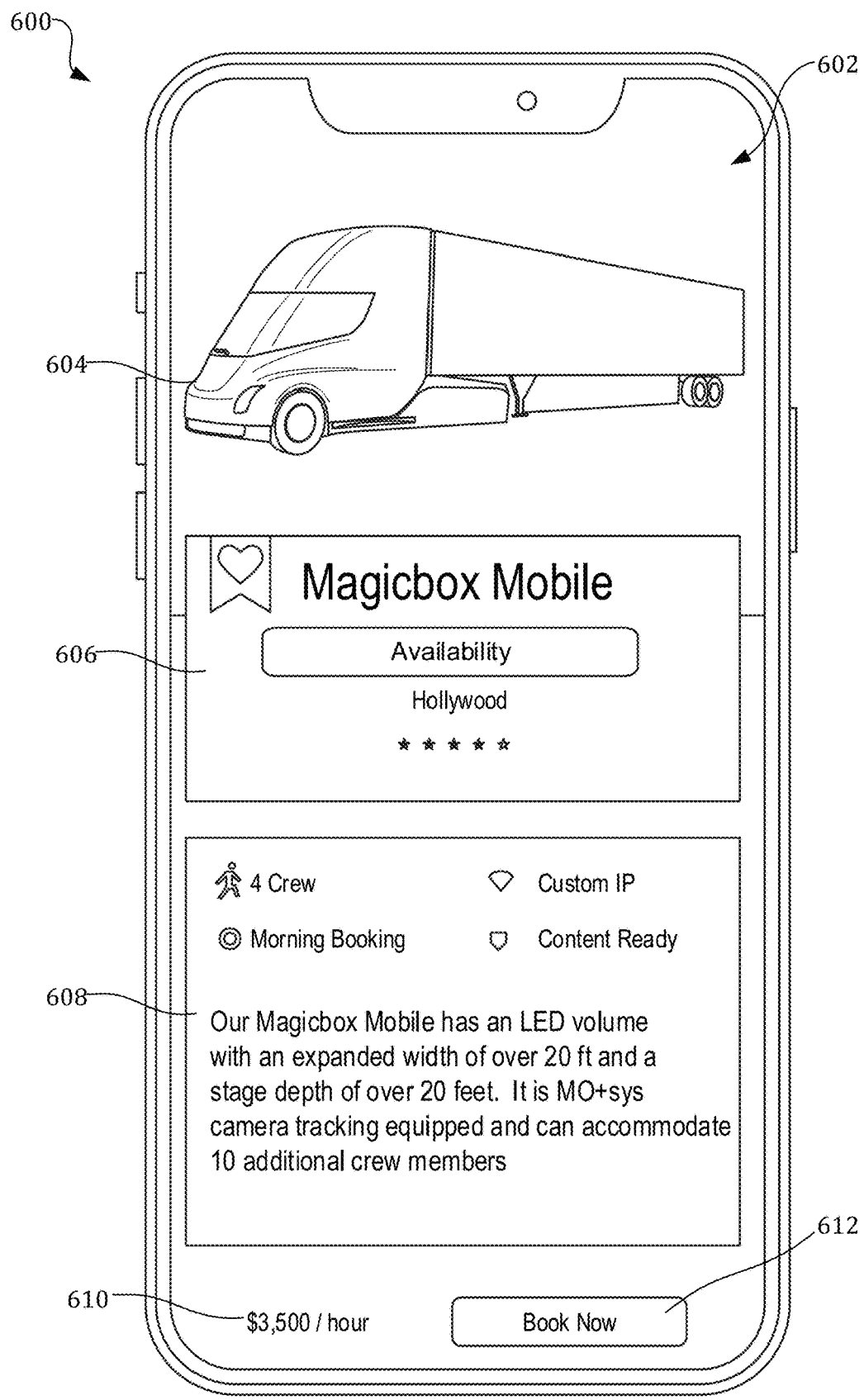
FIG. 6 depicts an example mobile application.

FIG. 6 depicts an example user interface 602 of a mobile application operating on a mobile device 600. The mobile application may be used to interact with and request delivery of a VBTLED volume. The user may be able to schedule, reserve, and process payments for a VBTLED volume and any related crew. For instance, when a user desires to film a scene using a VBTLED volume, the user may access the user interface to determine details of the VBTLED volume and order delivery of the VBTLED volume. Each user may have a private account that he or she can control to track and manage projects, bookings, and captured footage. The user interface 602 may include an image 604 of the specific VBTLED volume that would be delivered. The user interface 602 may also include a status information section 606 for the VBTLED volume being viewed. The status information section 606 may include the name of the VBTLED volume, which in this example is Magicbox Mobile. The status information section 606 may also include a current location for the VBTLED volume, which is Hollywood in the present example. An aggregated rating or review (indicated by the stars) may also be displayed in the status information section 606. An option to favorite (represented by the heart) the particular VBTLED volume being displayed may also be presented in the user interface 602.

A selectable availability option may also be presented. When the availability option is selected, the user may be presented with a listing of dates and/or times for which the VBTLED volume is available. The availability of the VBTLED volume may also be adjusted based on a location of the user of the mobile device 600 and the current location of the VBTLED volume. The location of the user may be automatically detected by the application based on global positioning sensors (GPS) or other positioning information (e.g., triangulation) features of the mobile device 600. In other examples, the location of the user may be manually input by the user. The availability may also or alternatively be based on a manually entered delivery destination, which may be different than a current location of the user.

A detailed information section 608 may also be displayed in the user interface 602. The detailed information section 608 includes additional details about the VBTLED volume that is being viewed. For instance, the detailed information section 608 includes information such as the number of crew members that come with the VBTLED volume, booking times, technology features (such as a custom IP address), types of content that may be used in the VBTLED volume, size of the VBTLED volume, LED panel layout and configuration details, capacity of the VBTLED volume, additional features such as camera tracking, and other potential details about the VBTLED volume.

The pricing 610 or rate for renting the VBTLED volume may also be displayed in the user interface along with and booking option 612 to book the VBTLED volume displayed. When the booking option 612 is selected, additional user interface features may be presented to facilitate completion of booking and payment for the VBTLED volume. When the booked time approaches, the VBTLED volume is then delivered to the delivery location specified by the user.

Figure 7:
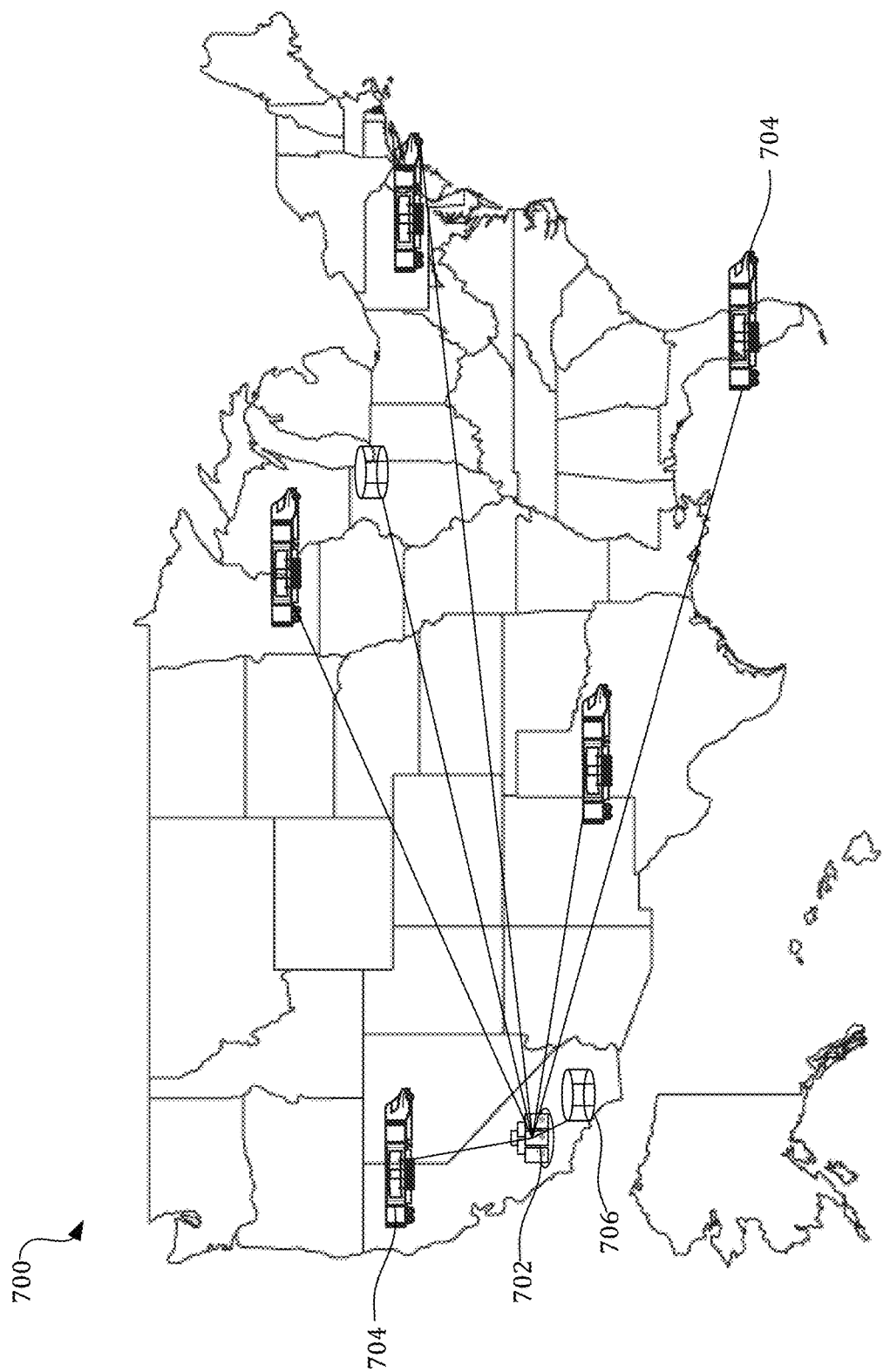
FIG. 7 depicts an example network of vehicular-based transforming LED volumes.

FIG. 7 depicts an example network 700 of vehicular-based transforming LED volumes 704 and permanent LED volumes 706. The VBTLED volumes 704 and permanent LED volumes 706 may be dispersed at various locations around the country or internationally. In addition, because the VBTLED volumes 704 may be moved or transported to different locations, the positions and locations of the VBTLED volumes 704 may frequently change. Accordingly, the locations of the VBTLED volumes 704 may be tracked by one or more servers 702 with which the VBTLED volumes are in communication. For instance, the location of the VBTLED volumes may be tracked via GPS or other positioning systems (e.g., triangulation) such that the servers 702 have up-to-date information on the locations of the VBTLED volumes. The locations of the permanent LED volumes 706 may be permanently stored as the locations do not change.

Additional usage information for the VBTLED volumes 704 may also be communicated to the servers 702, such as operational status of the VBTLED volumes, power consumption, available battery life, and other information. In the event of a failure or degradation of one of the VBTLED volumes, a closest available VBTLED volume may be identified by the servers 702 and dispatched to replace the failing or degrading VBTLED volumes. When a request is received for a delivery destination of a VBTLED volume, the servers 702 may determine the closest VBTLED volume 704 to the delivery destination and/or which of the VBTLED volumes 704 will be closest to the delivery destination at the requested delivery time. That identified VBTLED volume may be displayed, or displayed first in a list, of available VBTLED volumes in the user interface 602 discussed above. In some examples, a permanent LED volume 706 may be closer to the destination location, and one or more permanent LED volumes 706 may be displayed.

Figure 8:
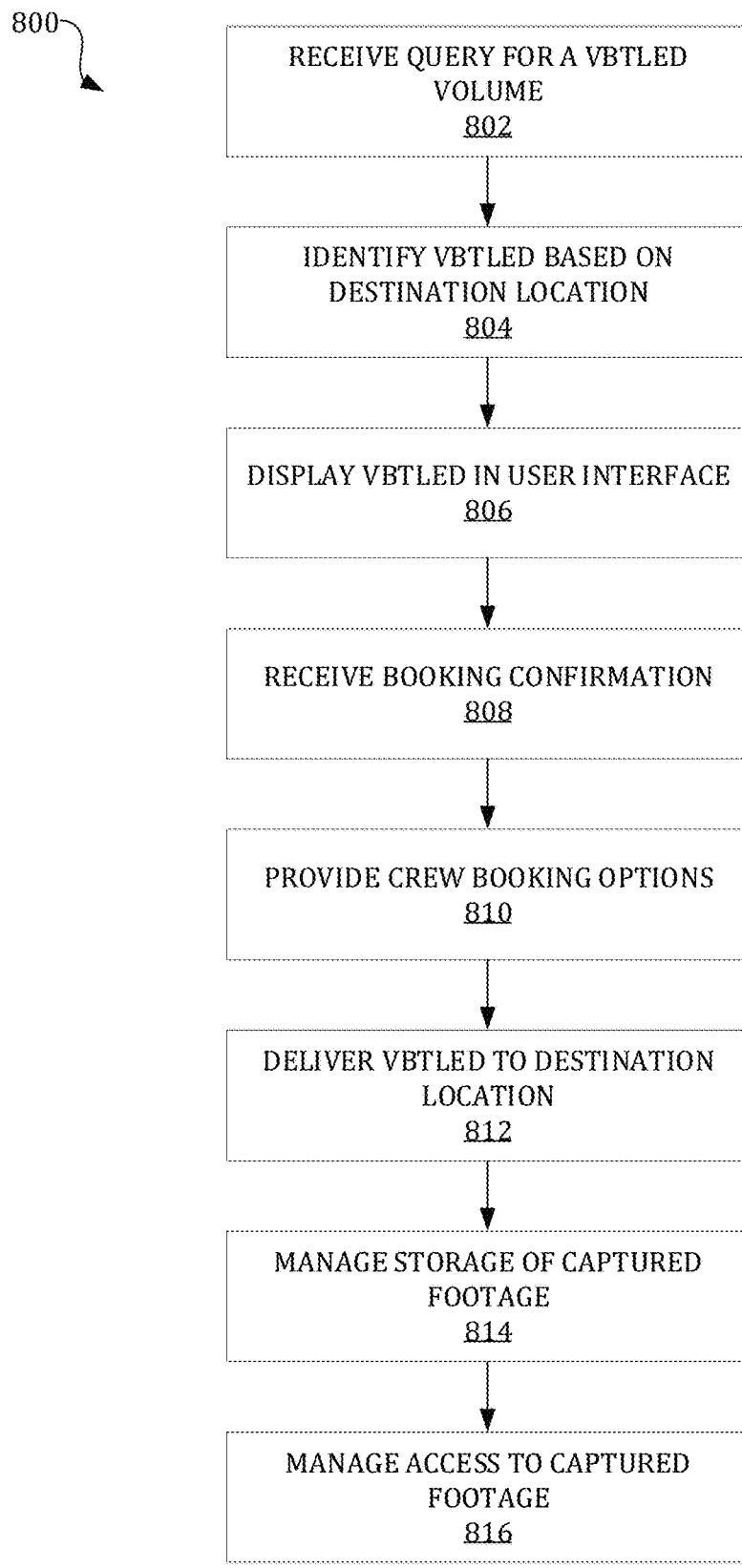
FIG. 8 depicts an example method for accessing one or more vehicular-based transforming LED volumes.

FIG. 8 depicts an example method 800 for accessing one or more vehicular-based transforming LED volumes. At operation 802, a query is received for a VBTLED volume. The query may include a destination location for the VBTLED volume. The query may also include particular features of the VBTLED volume that the user would like to have in the VBTLED volume. The query may also include dates for which the VBTLED volume is desired.

At operation 804, one or more VBTLED volumes that fit the query criteria may be identified. For example, the VBTLED volumes may be identified based on the location of the VBTLED volumes and the destination location. At operation 806, at least one of the VBTLED volumes that are identified in operation 804 are displayed in a user interface, which may be similar to the user interface 602 described above with reference to FIG. 6. In addition to displaying the potential VBTLED volumes, a content library preview may also be displayed or presented. For example, the ability to search, preview, and/or reserve digital environments and backgrounds from a library of pre-made options may be provided. In such examples, the selected environments or backgrounds may be loaded on the VBTLED volume prior to delivery.

At operation 808, a booking confirmation may be received. The booking confirmation may include a particular duration for booking of the VBTLED volume. The booking confirmation may also include a selected digital environment or background from the content library. The booking confirmation may be received based on a selection of a booking button or user interface element of the user interface.

At operation 810, the booking party is offered options to book virtual production crew members from the company providing the VBTLED volume or to use the app to book crew from their personal network. If a crew is booked, the user may also be given the option to process payroll and workers compensation insurance through the application. For example, virtual effects (VFX) partners or persons may be provided via the app or other user interface. The user may then have the ability to search, review, and contact the VFX partners. The listed VFX partners may be limited to those that have been trained, tested, and/or approved for digital environment creation with a VBTLED volume.

At operation 812, the booked VBTLED volume is delivered to the destination location on or prior to the duration set in the booking. The VBTLED volume may be delivered by a vehicle delivery and disconnected from the vehicle upon being delivered. Once the VBTLED volume has been delivered, access to the VBTLED volume may be controlled via mobile devices and/or through the mobile application. For instance, doors of the VBTLED volume may unlock based on proximity of a registered mobile device to the VBTLED volume. The mobile devices that are registered and verified may be added or removed via the mobile application (or an equivalent web application). For instance, the user that requested/booked the VBTLED volume may add registered devices of other crew members such that they have access as well via their respective registered devices.

In addition, once the VBTLED volume is booked and/or delivered, the booking party or user may be provided with additional access and information about the VBTLED volume that is provided via the mobile application or web application. For instance, the physical location, operational state, computer specifications, software versions, and/or power consumption of the VBTLED volume may be provided through the application to the user that booked the VBTLED volume.

The mobile application discussed above with respect to FIG. 6 may also be used to control additional aspects of the production process, such as a managing the captured footage during production in the VBTLED volume. For instance, at operation 814, the application may display options for managing the captured footage in the remote or cloud-based storage. For instance, the application may allow a user to move footage from one location to another or to perform simple edits or manipulation of the footage in the remote or cloud storage. At operation 816, access to the stored footage may also be controlled through the mobile application. For instance, the application may display options to add additional users or accounts to have access to the footage in the remote storage. Similarly, the application may also allow the user to remove users or accounts from having access to the footage.

The mobile or web application may also provide for the ability to search for and enroll in training or accreditation courses that cover the operation of the rendering engine and other systems of the VBTLED volume. In some examples, the course content may also be virtually delivered to the user via the mobile or web application. The courses may include a digital and/or traceable badge to certify completion of the course. The badges or certifications may then be linked to the account of the user.

While the present technology has been primarily discussed with respect to film production and the motion picture industry, the present technology may have additional uses. For instance, the VBTLED volumes discussed herein may be used in educational environments. The VBTLED volume may be delivered to a school where a classroom of students may enter the LED volume to be virtually transported to a 3D scene presented on the LED panels of the LED volume. For example, the Roman Coliseum may be displayed on the LED panels such that the people in the LED volume perceive that they are actually located within the Coliseum. Unlike virtual reality headsets, the LED volume allows for multiple people to share in the three-dimensional experience and learn together.

Other uses of the technology are also possible and contemplated. As an example, a person within the LED volume may be provided a three-dimensional experience of a camera or person in another location. For instance, a 3D camera located in another geographic location (e.g., Tokyo) may live stream the captured 3D images and/or video. That captured 3D video may then be displayed in the LED volume such that the person within the LED volume perceives that they are in the separate location. Such uses may be beneficial for those that have disabilities preventing them traveling or experiences the other geographic locations. Such uses may also be beneficial for retail to allow for remote shopping via a physical proxy, such as a robot or other person with the 3D camera.

Figure 9:
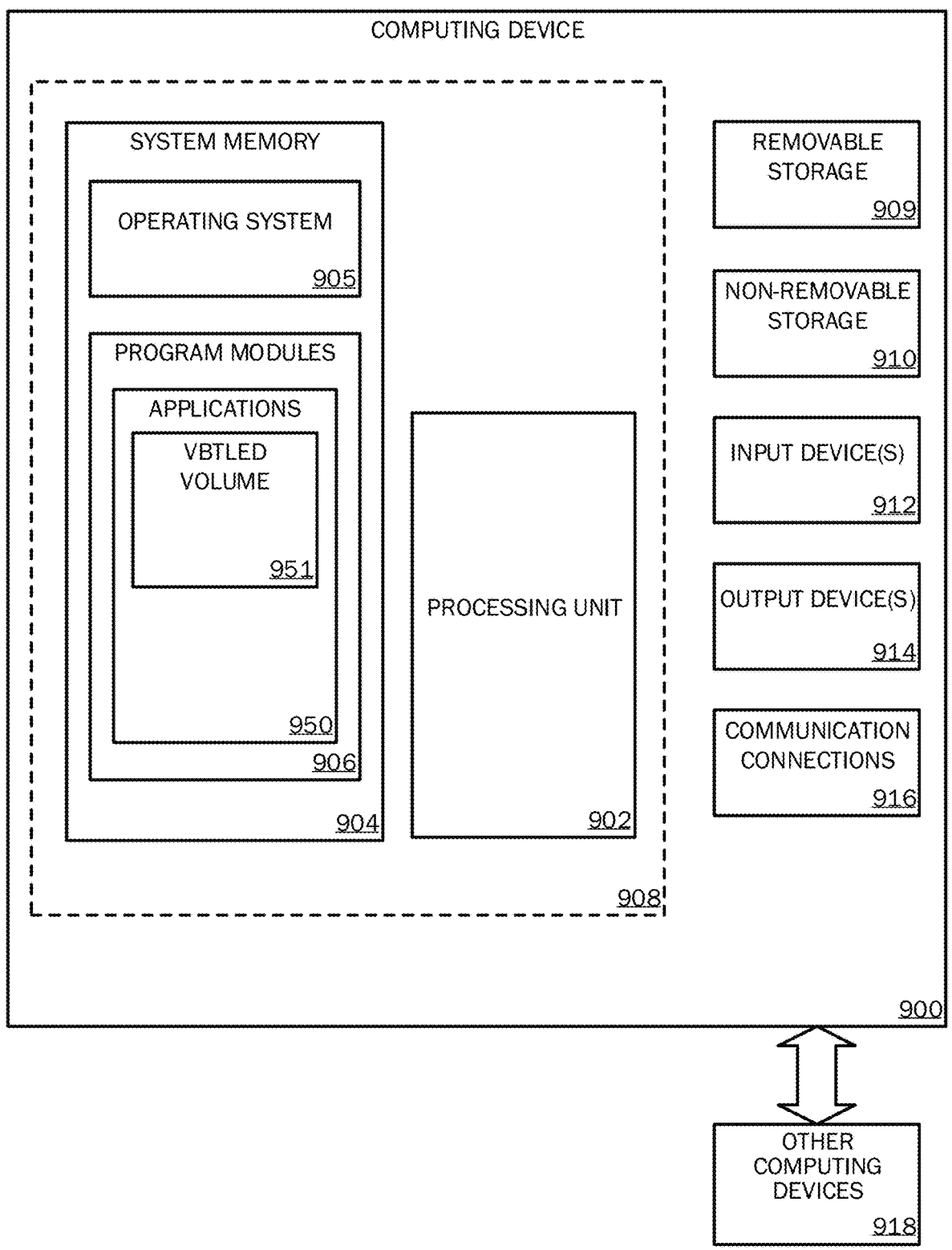
FIG. 9 is a block diagram illustrating example physical components of a computing device with which aspects of the present technology may be practiced.

FIG. 9 is a block diagram illustrating physical components (i.e., hardware) of a computing device 900 with which examples of the present disclosure may be practiced. The computing device components described below may be suitable for the mobile device described above as well as the computing system used to implement the virtual production techniques discussed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 950 such as VBTLED volume applications 951. The operating system 905, for example, may be suitable for controlling the operation of the computing device 900. Furthermore, aspects of the invention may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or solid state. Such additional storage is illustrated in FIG. 9 by a removable storage device 909 and a non-removable storage device 910.

As stated above, a number of program modules and data files may be stored in the system memory 904. While executing on the processing unit 902, the program modules 906 may perform processes including, but not limited to, one or more of the stages or operations of the methods described herein. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a computer or in any other circuits or systems.

The computing device 900 may also have one or more input device(s) 912 such as a keyboard, a mouse, a pen, an optical input device, a sound input device, a touch input device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
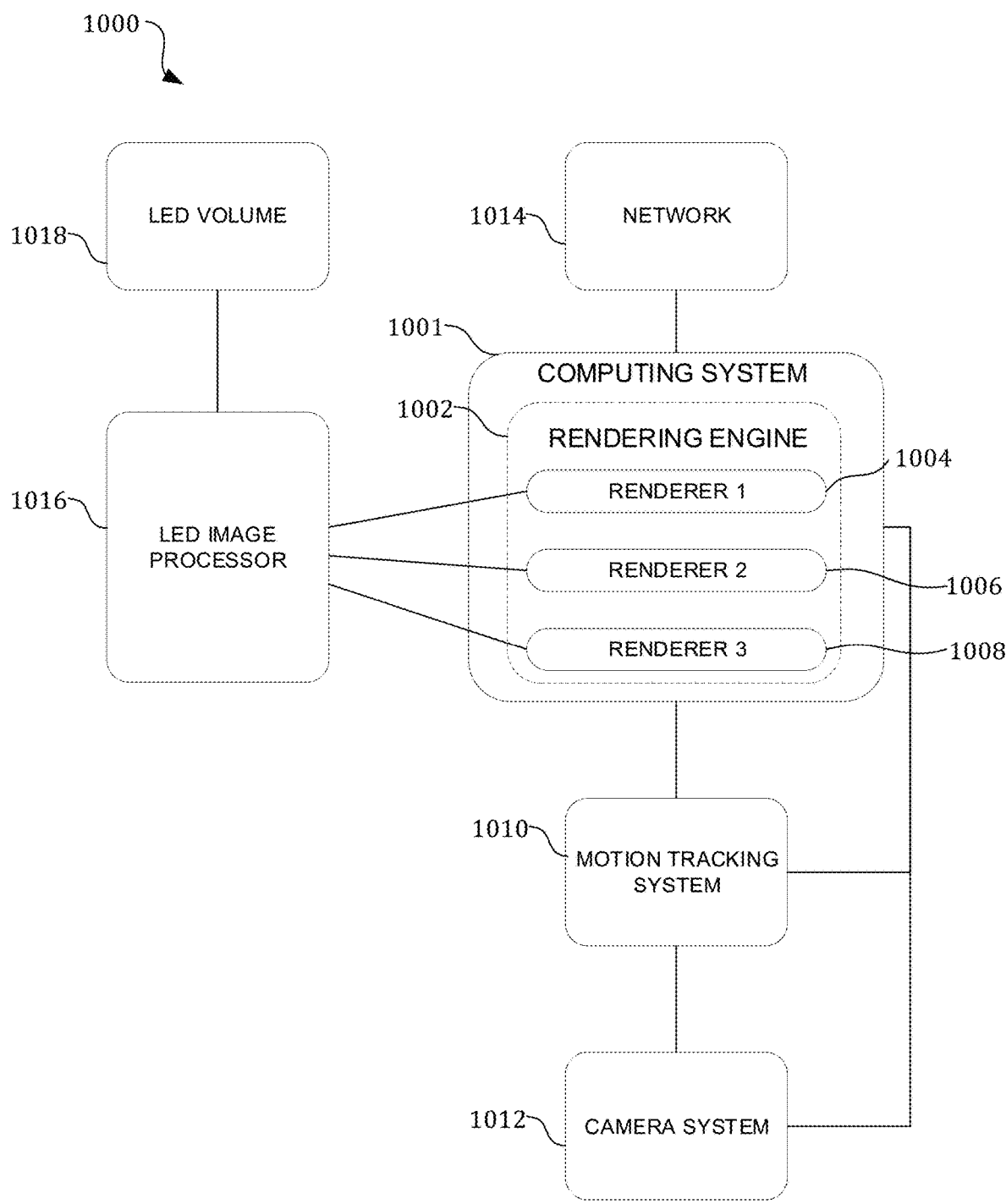
FIG. 10 depicts an example system with which aspects of the present technology may be practiced.

FIG. 10 depicts an example system 1000 with which aspects of the present technology may be practiced. The system 1000 includes a computing system 1001 that includes a video rendering engine 1002. The computing system 1001 may include one or more of the components of the computing device 900 discussed above with reference to FIG. 9. The video rendering engine 1002 may be 3D video rendering engine, such as a video game engine, as discussed above. The video rendering engine 1002 may include multiple renderers 1004, 1006, 1008 that generate video signals for the LED panels of an LED volume 1018. The renders may include a first renderer 1004, a second renderer 1006, and a third renderer 1008. The different renderers may generate video signals for different LED panels based on their relative positions and/or their pixel pitch or resolution. For instance, the first renderer 1004 may be responsible for generating a video signal for the primary LED panel of the LED volume, the second renderer 1006 may be responsible for generating a video signal for the side LED panels (e.g., stage-left and stage-right panels), and the third renderer 1008 may be responsible for generating a video signal for the ceiling LED panels. An additional renderer may be provided for additional types of LED panels, such as a floor LED panel.

The system 1000 may also include an LED image processor 1016 that is communicatively coupled to the rendering engine and the LED volume 1018. The LED processor 1016 processes or converts the video signals from the rendering engine 1002 to a format that can be delivered to the respective LED panels of the LED volume 1018 to generate the visuals discussed herein.

The system 1000 may also include a motion tracking system 1010 and a camera system 1012. The motion tracking system 1010 tracks the position of the camera 1012, and the motion tracking system provides that tracked position and/or motion data to the video rendering engine 1002. The video rendering engine 1002 then uses that data to modify or generate the video output of the scenes. Thus, the position of the camera can be taken into account to accurately provide parallax effects to increase the realistic effect of the background scenes displayed in the LED volume.

The computing system 1001 and/or the rendering engine 1002 may also be in communication with a network 1014 through cellular-based communications (e.g., 5G networking) or other communication protocols (e.g., Wi-Fi, etc.). Video content generated by the rendering engine 1002 and/or captured by the camera system 1012 may be communicated over the network 1014. In addition, controls, commands, or other types of data may be received by the rendering engine 1002 via the network 1014. For instance, scenes, content, templates, or other data may be loaded into the rendering engine 1002 via the network 1014. One ore more of the LED volume 1018, the LED image processor 1016, the computing system 1001, the video rendering engine 1002, the motion tracking system 1010, and/or the camera 1012 may be part of the trailers, portable enclosures, and/or the VBTLED volumes discussed above.

While the above technology has been primarily discussed with reference to LEDs and LED panels, it should be appreciated that the use of other suitable light-emitting technology (such as liquid crystal displays (LCDs)) capable of displaying videos may also be used with the present technology and are encompassed within the present disclosure. Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

What is claimed is:

1. A portable light-emitting diode (LED) volume system comprising:
   a transforming trailer, mountable to a vehicle, the trailer having interior surfaces, a floor, and a ceiling;
   a first movable LED panel coupled to a first surface of the interior surfaces;
   a second LED panel coupled to second surface of the interior surfaces; and
   a third movable LED panel coupled to a third surface of the one or more interior surfaces,
   wherein the first LED panel, the second LED panel, and the third LED panel form an LED volume configured to display visuals for a scene filmed within the LED volume, and wherein the visuals extend across the first LED panel, the second LED panel, and the third LED panel to form a contiguous visual representation of the scene.

2. The portable LED volume system of claim 1, further comprising a camera tracking system, including at least one position identifier mountable to a camera and a tracking system mounted to one of the interior surfaces, the tracking system configured to track a position of the position identifier on the camera.

3. The portable LED volume system of claim 2, wherein the visuals change based on the tracked position of the position identifier on the camera.

4. The portable LED volume system of claim 1, wherein the first surface and the third surface are movable surfaces that move when the transforming trailer expands.

5. The portable LED volume system of claim 1, further comprising a battery-based power system within the trailer for powering the LED volume.

6. The portable LED volume system of claim 5, wherein the battery-based power system is capable of storing regenerated power captured through use of at least one of solar panels mounted on an exterior of the trailer, an external power source, or a shore power source.

7. The portable LED volume system of claim 1, further comprising a rotatable stage, on the floor of the transforming trailer, within the LED volume.

8. The portable LED volume system of claim 1, wherein at least one of the first LED panel, the second LED panel, or the third LED panel are positionable to form different configurations of the LED volume.

9. The portable LED volume system of claim 8, wherein the different configurations of the LED volume correspond to a 3D LED volume template for a video rendering engine.

10. The portable LED volume system of claim 1, wherein the ceiling includes a fourth LED panel.

11. A transformable light-emitting diode (LED) volume system comprising:
- a primary LED panel;
- a first stage-left or stage-right LED panel coupled to the primary LED panel;
- a second stage-left or stage-right LED panel rotatably coupled to the first stage-left LED panel or second stage-right LED panel such that the second stage-left LED panel or stage-right panel can be rotated inwards towards the primary LED panel; and
- a ceiling LED panel.

12. The transformable LED volume system of claim 11, further comprising a rotatable stage on a floor of the LED volume system.

13. The transformable LED volume system of claim 11, wherein the primary LED panel and the first stage-left or stage-right LED panel form an LED volume configured to display visuals for a scene filmed within the LED volume, and wherein the visuals extend across the primary LED panel and the first stage-left or stage-right LED panel to form a contiguous visual representation of the scene.

14. The transformable LED volume system of claim 13, further comprising a camera tracking system, including at least one position identifier mountable to a camera and a tracking system, the tracking system configured to track a position of the position identifier on the camera.

15. The transformable LED volume system of claim 14, wherein the visuals change based on the tracked position of the position identifier on the camera.

16. The transformable LED volume system of claim 11, wherein the ceiling LED panel is a first ceiling LED panel, and the transformable LED volume system further comprises a second ceiling LED panel rotatably coupled to the first ceiling LED panel such that the second ceiling LED panel can rotate downwards towards to the primary LED panel.

17. The transformable LED volume system of claim 16, further comprising a rail positioned in a gap between the first ceiling LED panel and the second ceiling LED panel, the rail including attachment positions for lighting.

18. A vehicular-based transforming LED volume, comprising:
- a portable enclosure, configured to be transported by a vehicle, the portable enclosure including a lateral wall, a floor, and a ceiling, the portable enclosure further comprising:
  - a primary LED panel connected to the lateral wall;
  - a stage-left LED panel coupled to the primary LED panel;
  - a stage-right LED panel coupled to the primary LED panel, wherein the primary LED panel, the stage-left LED panel, and the stage-right LED panel form an LED volume; and
  - a rotatable stage, on the floor of the portable enclosure, within the LED volume.

19. The vehicular-based transforming LED volume of claim 18, wherein the LED volume configured to display visuals for a background of a scene filmed within the LED volume.

20. The vehicular-based transforming LED volume of claim 18, wherein the lateral wall is a driver-side wall or a passenger-side wall that is expandable.

* * * * *